(12) United States Patent
Shen et al.

(10) Patent No.: US 7,986,264 B2
(45) Date of Patent: Jul. 26, 2011

(54) POSITIONING SYSTEM, IC CHIP FOR POSITIONING, POSITIONING METHOD, AND POSITIONING PROGRAM

(75) Inventors: Jiyun Shen, Yokohama (JP); Yasuhiro Oda, Yokosuka (JP); Kosei Takiishi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 367 days.

(21) Appl. No.: 12/171,597

(22) Filed: Jul. 11, 2008

(65) Prior Publication Data

US 2009/0015471 A1      Jan. 15, 2009

(30) Foreign Application Priority Data

Jul. 13, 2007   (JP) ................................ P2007-184883

(51) Int. Cl.
*G01S 19/52*   (2010.01)
(52) U.S. Cl. ................................. 342/357.35
(58) Field of Classification Search ... 342/357.2–357.78
See application file for complete search history.

(56) References Cited

U.S. PATENT DOCUMENTS

| | | | | |
|---|---|---|---|---|
| 7,136,015 B2 * | 11/2006 | Wakamatsu | ............ | 342/357.23 |
| 2003/0162552 A1 | 8/2003 | Lehtinen | | |
| 2006/0290565 A1 * | 12/2006 | Terashi et al. | ............ | 342/357.08 |

OTHER PUBLICATIONS

Takeyasu Sakai, "Introducing of GPS Technology", Tokyo Denki University Press, Feb. 28, 2003, 2 cover pages and pp. 36-41, (with English translation).
Bradford W. Parkinson, et al., "Global Positioning System: Theory and Applications", American Institute of Aeronautics and Astrinautics, Inc., vol. 164, 1996, 1 cover page and pp. 142-165.
Chinese Office Action issued Feb. 28, 2011, in Chinese Patent Application No. 200810130322.2 with English translation.

* cited by examiner

*Primary Examiner* — Thomas H Tarcza
*Assistant Examiner* — Nga X Nguyen
(74) *Attorney, Agent, or Firm* — Oblon, Spivak, McClelland, Maier & Neustadt, L.L.P.

(57) ABSTRACT

A positioning system accurately estimates transmission times of signals from a signal transmitter and measures a position of a receiver on the basis of the transmission times. The receiver 10 comprises a velocity-vector calculating unit 12 calculating velocity vectors of GPS satellites 20 on the basis of signals from the GPS satellite; a satellite selecting unit 13 generating a combination of velocity vectors from the calculated velocity vectors and selecting a combination of GPS satellites from the GPS satellites on the basis of the combination of velocity vectors; a position calculating unit 15 calculating positions of the receiver 10 at a plurality of times, the times being signal transmission times, on the basis of signals from the selected GPS satellites; and a position-accuracy evaluating unit 17 evaluating the accuracy of the calculated positions of the receiver 10, setting one time selected from the plurality of times corresponding to the plurality of positions as a transmission time, and setting the position of the receiver 10 corresponding to the transmission time as an estimated position.

11 Claims, 14 Drawing Sheets

POSITIONING SYSTEM, IC CHIP FOR POSITIONING, POSITIONING METHOD, AND POSITIONING PROGRAM

BACKGROUND OF THE INVENTION

1. Field of the Invention

The present invention relates to a positioning system, an IC chip for positioning, a positioning method, and a positioning program for estimating the position of a receiver.

2. Related Background Art

Positioning of receivers using a global positioning system (GPS) or Galileo is known technology. Such systems perform positioning on the basis of the distance from a satellite (which may also be a pseudo-satellite), which is a positioning signal transmitter, to a receiver. Another positioning method referred to as a hybrid method is also known which uses signals from a satellite and signals from a mobile communication network at the same time.

With these positioning methods, the distance from a satellite to a receiver is calculated on the basis of the transmission time and the time of receipt of a positioning signal sent from the satellite to the receiver, and calculation for the positioning is performed using the calculated distance. If the distances from a plurality of satellites to a receiver and the positions of the satellites are accurately calculated, the position of the receiver can be determined through calculation of the intersection of spheres having radii from the centers at which the satellites lie, the radii corresponding to the distances from the positions of the satellites. However, such a method to calculate the distance involves various factors that may cause errors, which preclude accurate calculation of the distance. Therefore, a least-square method is used to calculate the position of the receiver on the basis of the calculated distances from the plurality of satellites to the receiver. Such a method is described in, for example, Takeyasu Sakai, "GPS Gijutsu Nyumon (Introduction to GPS Technology) (pp. 36-41)", Tokyo Denki Daigaku Shuppan, Feb. 28, 2003.

SUMMARY OF THE INVENTION

To calculate the positions of the GPS satellites, it is necessary to acquire accurate satellite orbit information and transmission times. Usually, the satellite orbit information and the transmission time data can be acquired by receiving navigation messages that are constantly sent from the satellites. However, sometimes the transmission time cannot be correctly received. If the GPS signal intensity is low at a location, for example, at an interior, the detected transmission time information may include an error. In such a case, the position of a satellite cannot be correctly calculated due to the error in the detected transmission time information. Therefore, the sphere centered at the position of the satellite cannot be correctly calculated. As a result, the correct position of a receiver cannot be calculated.

In this way, with a positioning method using satellites, the estimated transmission time of signals have much effect on the positioning accuracy. The accuracy of the estimated transmission time greatly varies depending on selection of the satellites to be used for positioning. In particular, if the number of satellites capable of receiving is small, or in case of the hybrid positioning, sometimes the transmission times cannot be estimated depending on the satellites to be used.

The present invention has been conceived in light of the above-described problems. It is an object of the present invention to provide a positioning system, a positioning IC chip, a positioning method, and a positioning program that are capable of accurately estimating transmission times of signals from signal transmitters and to accurately estimate the position of a receiver on the basis of the estimated transmission times.

To achieved the above-described purpose, the present invention provides a positioning system estimating the position of a receiver, the positioning system including velocity-vector calculating means for calculating velocity vectors of a plurality of signal transmitters on the basis of signals sent from the signal transmitters to the receiver; signal-transmitter selecting means for generating a combination of velocity vectors from the velocity vectors calculated by the velocity-vector calculating means and selecting a combination of signal transmitters from the plurality of signal transmitters on the basis of the selected combination of velocity vectors; position calculating means for calculating positions of the receiver at a plurality of times, the times being signal transmission times, on the basis of signals transmitted from the signal transmitters selected by the signal-transmitter selecting means and received by the receiver; transmission-time setting means for evaluating the accuracy of the positions of the receiver calculated by the position calculating means and setting one time selected from the plurality of times corresponding to the plurality of positions as a transmission time; and estimated-position setting means for setting the position of the receiver corresponding to the transmission time set by the transmission-time setting means as an estimated position of the receiver.

The present invention provides a positioning IC chip estimating the position of a receiver, the positioning IC chip including velocity-vector calculating means for calculating velocity vectors of a plurality of signal transmitters on the basis of signals sent from the signal transmitters to the receiver; signal-transmitter selecting means for generating a combination of velocity vectors from the velocity vectors calculated by the velocity-vector calculating means and selecting a combination of signal transmitters from the plurality of signal transmitters on the basis of the generated combination of velocity vectors; position calculating means for calculating positions of the receiver at a plurality of times, the times being signal transmission times, on the basis of signals transmitted from the signal transmitters selected by the signal-transmitter selecting means and received by the receiver; transmission-time setting means for evaluating the accuracy of the positions of the receiver calculated by the position calculating means and setting one time selected from the plurality of times corresponding to the plurality of positions as a transmission time; and estimated-position setting means for setting the position of the receiver corresponding to the transmission time set by the transmission-time setting means as an estimated position of the receiver.

The present invention provides a positioning method in which a positioning system estimates the position of a receiver, the positioning method including a velocity-vector calculating step in which the positioning system calculates velocity vectors of a plurality of signal transmitters on the basis of signals sent from the signal transmitters to the receiver; a signal-transmitter selecting step in which the positioning system generates a combination of velocity vectors from the velocity vectors calculated in the velocity-vector calculating step and selects signal transmitters from the plurality of signal transmitters on the basis of the generated combination of velocity vectors; a position calculating step in which the positioning system calculates positions of the receiver at a plurality of times, the times being signal transmission times, on the basis of signals transmitted from the signal transmitters selected in the signal-transmitter selecting step and received by the receiver; a transmission-time setting step in which the positioning system evaluates the accuracy of the positions of the receiver calculated in the position calculating step and sets one time selected from the plurality of times corresponding to the plurality of positions as a transmission time; and a estimated-position setting step in which the positioning system sets the position of the receiver corresponding to the transmission time set in the transmission-time setting step as an estimated position of the receiver.

The present invention provides a positioning program for causing a computer to estimate the position of a receiver, the program causing the computer to execute: a velocity-vector calculating function of calculating velocity vectors of a plurality of signal transmitters on the basis of signals sent from the signal transmitters and received by the receiver; a signal-transmitter selecting function of generating a combination of velocity vectors from the velocity vectors calculated by the velocity-vector calculating function and of selecting signal transmitters from the plurality of signal transmitters on the basis of the generated combination of velocity vectors; a position calculating function of calculating positions of the receiver at a plurality of times, the times being signal transmission times, on the basis of signals transmitted from the signal transmitters selected by the signal-transmitter selecting function and received by the receiver; a transmission-time setting function of evaluating the accuracy of the positions of the receiver calculated by the position calculating function and of setting one time selected from the plurality of times corresponding to the plurality of positions as a transmission time; and a estimated-position setting function of setting the position of the receiver corresponding to the transmission time set by the transmission-time setting function as an estimated position of the receiver.

According to such a positioning system, positioning IC chip, positioning method, and positioning program, first, velocity vectors of signal transmitters are calculated on the basis of a plurality of signals sent from a plurality of signal transmitters and received by a receiver. Then, signal transmitters are selected from the plurality of signal transmitters on the basis of a combination of velocity vectors generated on the basis of the calculated velocity vectors. Then, positions of the receiver at a plurality of transmission times are calculated on the basis of signals from the selected signal transmitters. Then, the plurality of positions are evaluated to set one time from a plurality of times corresponding to the plurality of positions as a transmission time. Then, the position of the receiver corresponding to the set transmission time is set as an estimated position.

As a result of extensive research carried out by the present inventors, it was discovered that estimation of the transmission times of the plurality of signals sent from the plurality of signal transmitters is affected by a variation over time in the relative positions of the signal transmitters. The variation over time in the relative positions of the signal transmitters can be determined from velocity vectors indicating the traveling direction and the magnitude of the velocity (speed). Therefore, by selecting a signal transmitter on the basis of the combination of velocity vectors and setting one time from a plurality of times as a transmission time on the basis of signals from the selected signal transmitter, the transmission time of the signal from the signal transmitter can be accurately estimated. Furthermore, the position of the receiver corresponding to the time set as the transmission time is set as an estimated position of the receiver, whereby the position of the receiver can be accurately estimated.

With the positioning system according to the present invention, it is preferable that the signal-transmitter selecting means calculate a vector sum of the combination of velocity vectors and select signal transmitters from the plurality of signal transmitters on the basis of the calculated vector sum.

In such a case, the vector sum corresponding to the combination of velocity vectors is calculated, and a plurality of signal transmitters is selected according to the vector sum. In this way, the estimation of the transmission time can be easily performed by using a vector sum which can be easily calculated.

With the positioning system according to the present invention, it is preferable that the signal-transmitter selecting means generate a combination of velocity vectors calculated by the velocity-vector calculating means and selects signal transmitters corresponding to the velocity vectors when the vector sum of the generated combination of the velocity vectors is less than or equal to a predetermined threshold value.

In such a case, a combination of velocity vectors corresponding to the signal transmitters, which are the senders of signals, is generated, and a vector sum corresponding to the generated combination is calculated. If the magnitude of the calculated vector sum is less than or equal to a predetermined threshold value, all of the signal transmitters, which are the senders of signals, are selected. In general, the variation in the relative positions of the signal transmitters is large if the magnitude of the vector sum is small, thus enabling accurate estimation of the transmission time. Therefore, the accuracy of the estimation of the transmission time can be maintained at a certain level by evaluating the magnitude of the vector sum using a threshold value.

With the positioning system according to the present invention, it is preferable that the signal-transmitter selecting means generate a plurality of combinations of velocity vectors each including a number of velocity vectors smaller than the number of velocity vectors calculated by the velocity-vector calculating means, calculate a vector sum of each of the generated combinations, and select signal transmitters corresponding to the velocity vectors constituting the smallest vector sum among the calculated vector sums.

In such a case, a plurality of combinations of velocity vectors each including a number of velocity vectors smaller than the number of signal transmitters, which are the senders of signals, are generated, and a vector sum is calculated from each selected combination. Then, the signal transmitters corresponding to the velocity vectors of the smallest vector sum among the calculated vector sums are selected. In general, the variation in the relative positions of the signal transmitters is large if the magnitude of the vector sum is small, thus enabling accurate estimation of the transmission time. Therefore, the combination of the signal transmitters having the highest accuracy of the estimation of the transmission time can be obtained by selecting the signal transmitters corresponding to the combination of the smallest vector.

With the positioning system according to the present invention, it is preferable that the signal-transmitter selecting means calculate a value indicating a variation in the velocity vectors of the combinations and select signal transmitters from the plurality of signal transmitters on the basis of the calculated value.

In such a case, a value indicating a variation in the velocity vectors of the combinations of velocity vectors is calculated, and a plurality of signal transmitters is selected on the basis of the value. In this way, by using a value that indicates the variation, the variation in the relative positions of the signal transmitters can be accurately derived, resulting in accurate estimation of the transmission time.

With the positioning system according to the present invention, it is preferable that the signal-transmitter selecting means generate a combination of the velocity vectors calculated by the velocity-vector calculating means and select signal transmitters corresponding to the velocity vectors when the value indicating a variation in the velocity vectors of the generated combinations is equal to or more than a predetermined threshold value.

In such a case, a combination of velocity vectors corresponding to signal transmitters, which are the senders of signals, is generated, and a value indicating the variation in the velocity vectors of the generated combination is calculated. If the calculated value is equal to or more than a predetermined threshold value, all of the signal transmitters, which are the senders of signals, are selected. The variation in the relative positions of the signal transmitters is large if the value indicating the variation in the velocity vectors is large, thus enabling accurate estimation of the transmission time. Therefore, the accuracy of the estimation of the transmission time can be maintained at a certain level by evaluating the value indicating the variation in velocity vectors using a threshold value.

With the positioning system according to the present invention, it is preferable that the signal-transmitter selecting means generate a plurality of combinations of velocity vectors each including a number of velocity vectors smaller than the number of velocity vectors calculated by the velocity-vector calculating means, calculate values indicating variations in the velocity vectors of each of the generated combinations, and select signal transmitters corresponding to the velocity vectors having the maximum value among the calculated values.

In such a case, a plurality of combinations of velocity vectors each including a number of velocity vectors smaller than the number of signal transmitters, which are the senders of signals, is generated, and a value indicating a variation in the velocity vectors of each of the generated combination is calculated. Then, the signal transmitters corresponding to the velocity vectors that derive the largest value of all calculated values are selected. The variation in the relative positions of the signal transmitters is large if the value indicating the variation in the velocity vectors is large, thus enabling accurate estimation of the transmission time. Therefore, a combination of signal transmitters having the highest accuracy of estimating the transmission time can be obtained by selecting signal transmitters that correspond to the combination having the greatest value indicating the variation of velocity vectors.

According to such a positioning system, a positioning IC chip, a positioning method, and a positioning program, since one time is set as a transmission time of signals by selecting signal transmitters on the basis of a combination of velocity vectors, calculating the position of a receiver at a plurality of times on the basis of the signals from the selected signal transmitters, and evaluating the calculated position, the transmission time of a signal from a signal transmitter can be accurately estimated, and the position of the receiver can be accurately measured by the estimation.

DESCRIPTION OF THE PREFERRED EMBODIMENTS

Figure 1:
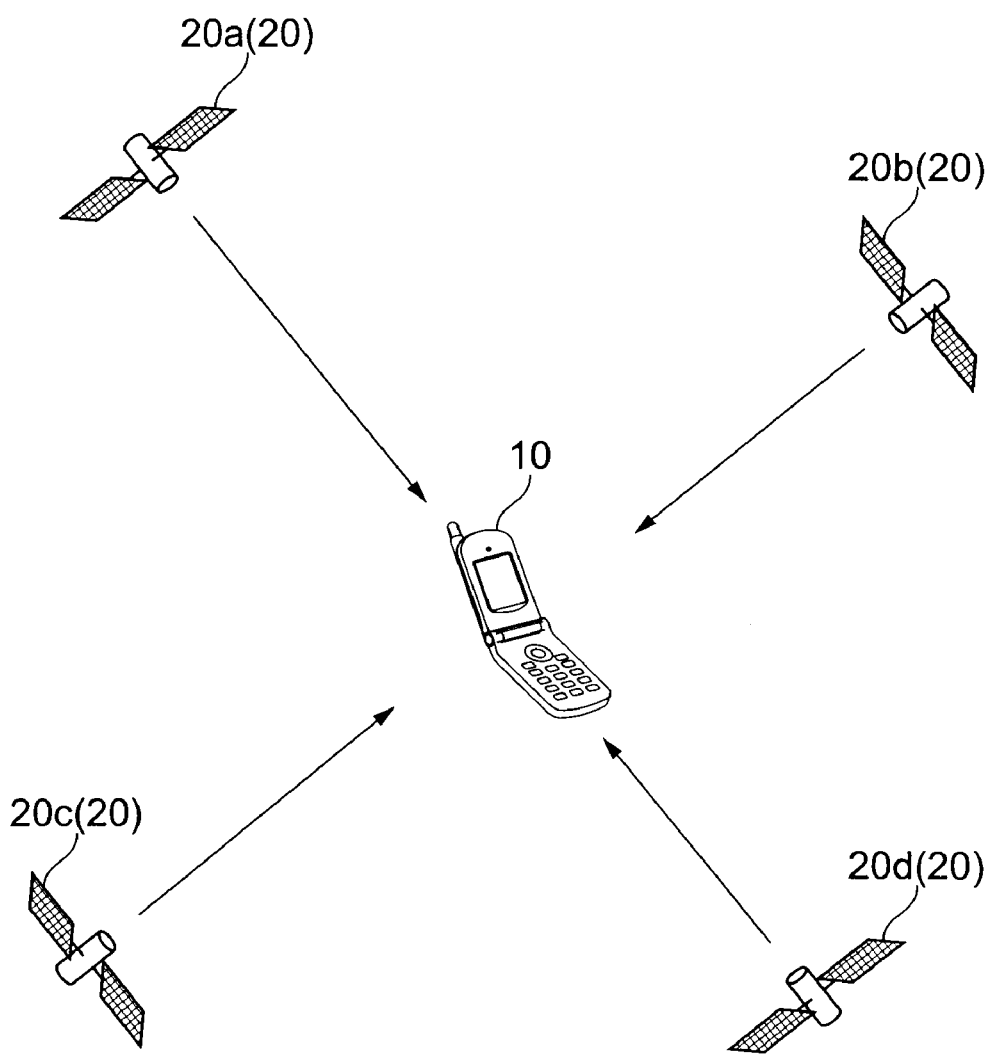
FIG. 1 illustrates a receiver and GPS satellites according to an embodiment of the present invention.

Embodiments of the present invention will be described in detail with reference to the attached drawings. Same or equivalent components mentioned in the description will be represented by the same reference numerals, and the same descriptions will not be repeated.

First, a receiver 10, which is a positioning system of this embodiment, and a plurality of GPS satellites 20, which are signal transmitters, will be described with reference to FIG. 1. FIG. 1 illustrates a receiver and GPS satellites according to an embodiment of the present invention. In FIG. 1, four GPS satellites 20a to 20d are shown. However, the number of GPS satellites 20 is not limited.

The receiver 10 is a positioning device that receives positioning signals (measurements), which are radio waves sent from the GPS satellites 20 and estimates its own position using the positioning signals. In addition to the positioning, the receiver 10 may perform mobile communication. The receiver 10 is, for example, a mobile communication terminal, such as a mobile phone. The receiver 10 determines its own position when, for example, a user instructs the receiver 10 to perform positioning.

The GPS satellites 20 are located at predetermined positions depending on time and transmit positioning signals from those positions. Four or five of the GPS satellites 20 are on each one of the six orbits at an altitude of approximately 20,000 km and move along the orbit over time. Each positioning signal sent from each of the GPS satellites 20 contains identification information for identifying the corresponding satellite 20, information indicating the orbit of the GPS satellite 20, and information about the time the signal is sent.

The principle of positioning in this embodiment is briefly described with reference to FIGS. 2 to 4. Here, an exemplary case in which the receiver 10 receives positioning signals from four GPS satellites 20a to 20d will be described. The receiver 10 calculates the distances to the GPS satellites 20a to 20d based on the positioning signals from the GPS satellites 20a to 20d. More specifically, the receiver 10 calculates distances a to d from the receiver 10 to the GPS satellites 20a to 20d, respectively, by multiplying the transmission time of a positioning signal (i.e., the elapsed time from the transmission of a positioning signal from one of the GPS satellites 20a to 20*d* to the reception of the positioning signal by the receiver 10) by the speed of light. The distances a to d can be derived from the flowing equations:

$$\text{distance } a = (\text{speed of light}) \times (t_{ra} - t_t)$$

$$\text{distance } b = (\text{speed of light}) \times (t_{rb} - t_t)$$

$$\text{distance } c = (\text{speed of light}) \times (t_{rc} - t_t)$$

$$\text{distance } d = (\text{speed of light}) \times (t_{rd} - t_t)$$

where $t_t$ represents a transmission time of the positioning signals, which is common for all of the GPS satellites 20*a* to 20*d*, and $t_{ra}$ to $t_{rd}$ represent reception times of the positioning signals at the receiver 10.

Figure 2:
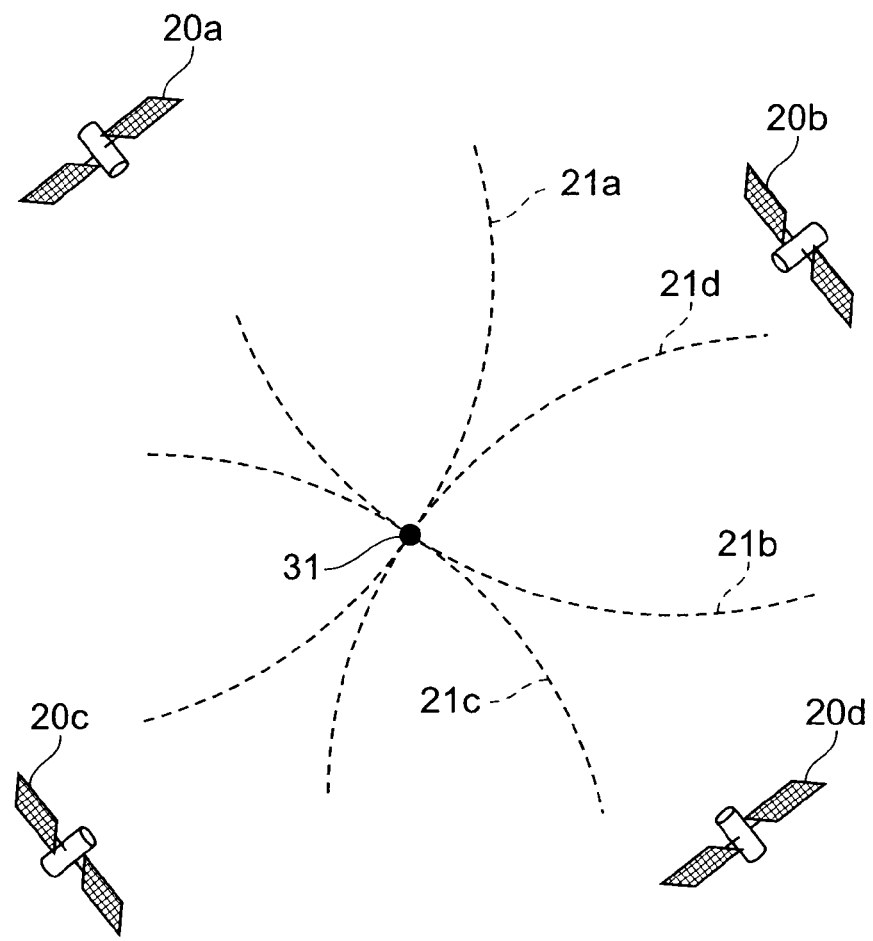
FIG. 2 illustrates the principle of positioning according to an embodiment.
Figure 3:
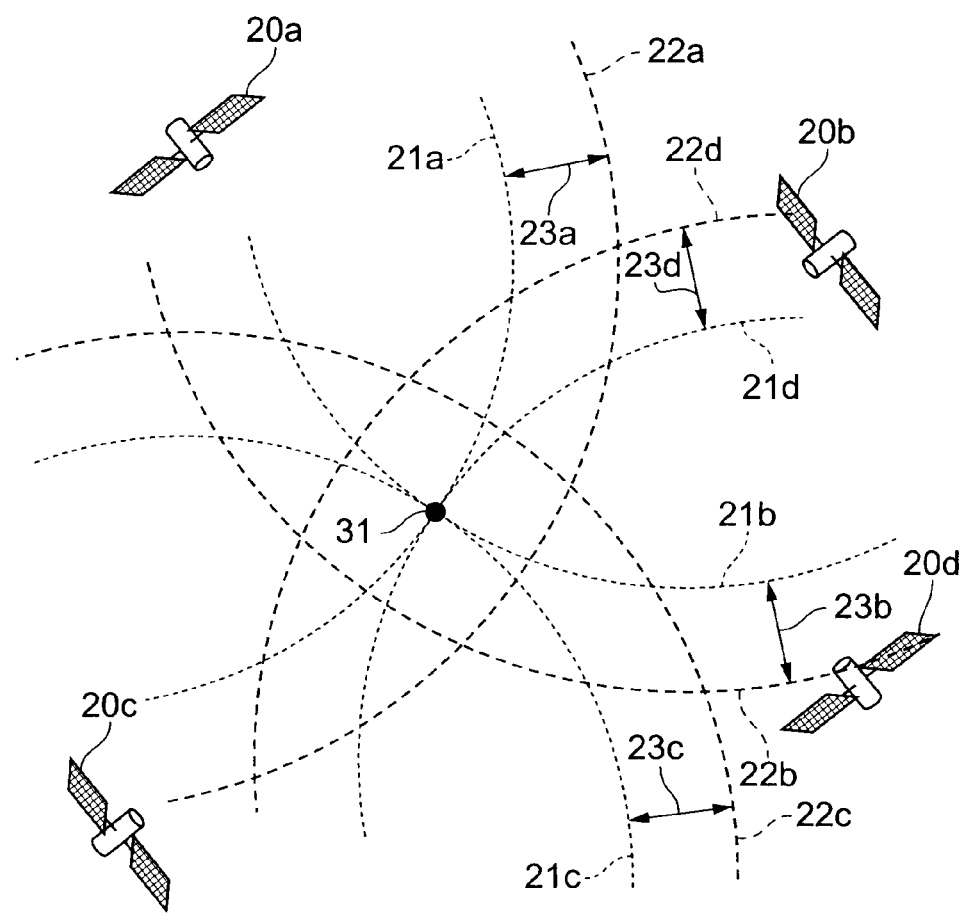
FIG. 3 illustrates the principle of positioning according to an embodiment.

By accurate calculation of the distances between the GPS satellites 20*a* to 20*d* and the receiver 10, the receiver 10 is positioned, as shown in FIG. 2, at the intersecting point 31 of a sphere (circle) 21*a* having a radius equal to the distance a and being centered at the position of the GPS satellite 20*a* and spheres (circles) 21*b* to 21*d* of the GPS satellites 20*b* to 20*d*, formed in the same manner as the sphere 21*a*.

However, usually, the calculated distances a to d include errors caused by, for example, time-lag between the GPS satellites 20*a* to 20*d* and the receiver 10, multipathing, errors in the orbit information of the GPS satellites 20*a* to 20*d*, and atmospheric fluctuation. As shown in FIG. 3, therefore, the calculated spheres (circles) 22*a* to 22*d* differ from the spheres (circles) 21*a* to 21*d* having radii equal to the actual distances (correct distances). If differences 23*a* to 23*d* between the actual distances and the calculated distance are equal for the GPS satellites 20*a* to 20*d*, the position of the receiver 10 can be accurately calculated by, for example, a least-square method, as the position 31, which has the same distance from the spheres (circles) 22*a* to 22*d*. In this case, at least four GPS satellites 20 must be used to calculate the position of the receiver 10.

Figure 4:
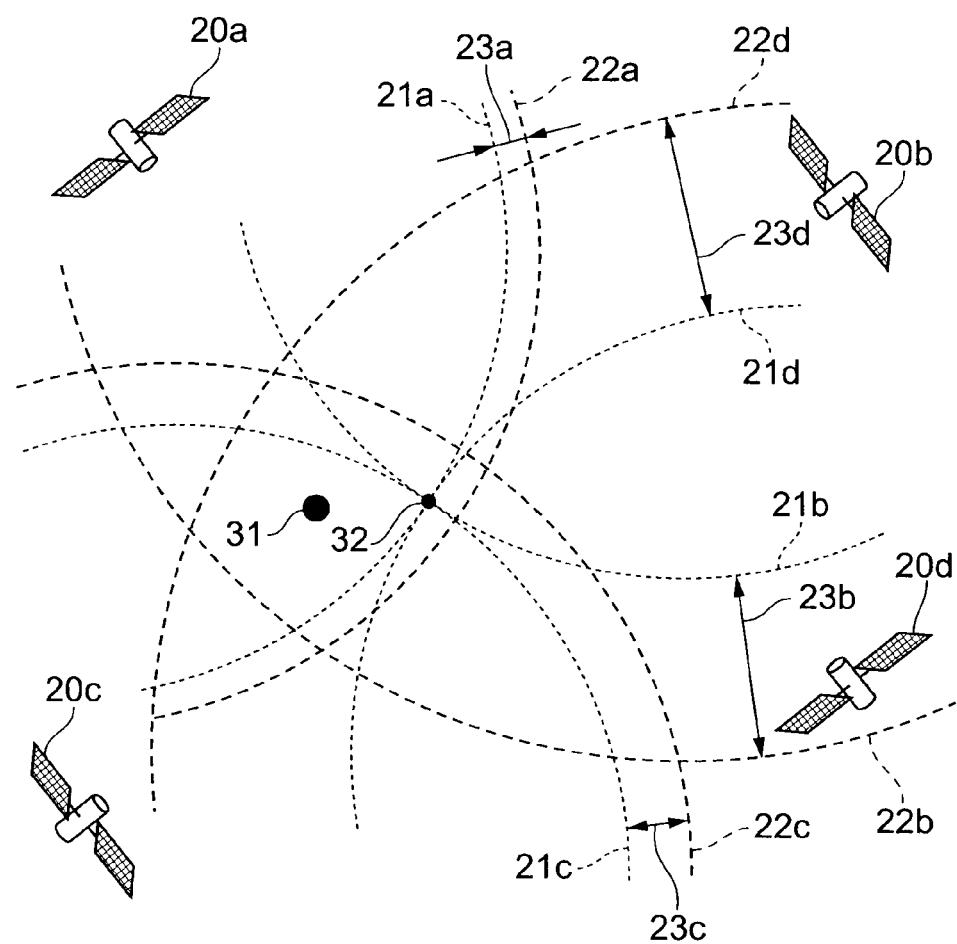
FIG. 4 illustrates the principle of positioning according to an embodiment.

However, as shown in FIG. 4, the differences 23*a* to 23*d* between the actual distances and the calculated distances vary among the GPS satellites 20*a* to 20*d*. In such a case, the position 31, which is calculated by the least-square method and is the same distance from the spheres (circles) 22*a* to 22*d*, differs from an actual position 32 of the receiver 10.

In this case, a difference between the calculated position and the actual position, i.e., positioning error, occurs due to the variation in the differences 23*a* to 23*d* of the calculated distances and the actual distances.

The distances (pseudo-distances) $pr_n$ (n=1 to 4) between the GPS satellites 20*a* to 20*d* and the receiver 10 can be represented as follows:

[Math 1]

$$\begin{cases} pr_1 = r_1 + clk_1 + \beta_1 + \varepsilon_1 \\ pr_2 = r_2 + clk_2 + \beta_2 + \varepsilon_2 \\ pr_3 = r_3 + clk_3 + \beta_3 + \varepsilon_3 \\ pr_4 = r_4 + clk_4 + \beta_4 + \varepsilon_4 \end{cases} \quad (1)$$

Here, $r_n$ represents the actual distances from the GPS satellites 20*a* to 20*d* to the receiver 10; $clk_n$ represents the difference between the clocks of the GPS satellites 20*a* to 20*d* and the clock of the receiver 10; and $\beta_n$ represents the difference between the clocks of the satellites. These error factors $r_n$, $clk_n$, and $\beta_n$, which results from, for example, errors in the orbit information and an atmospheric fluctuation, can be corrected. In contrast, $\varepsilon_n$ represents errors in the distance, which results from multipathing and errors that remain after correction of $\beta_n$, and cannot be corrected.

Since the clocks of the GPS satellites 20*a* to 20*d* synchronize with each other, the error factors $clk_n$ have the same value for the GPS satellites 20*a* to 20*d*. In other words, the $clk_n$ represents a clock bias of the receiver 10. The error factors $\beta_n$ can be corrected using parameters of the navigation messages of the GPS satellites 20. Since the error factor $\varepsilon_n$ includes components that vary with the environment and errors after correction of the error factors $\beta_n$, the error factor $\varepsilon_n$ varies among the GPS satellites 20*a* to 20*d* and the error factor $\varepsilon_n$ cannot be corrected by calculation or actual measurements. Accordingly, the above-described positioning errors are caused by error factors $\varepsilon_n$.

Figure 6:
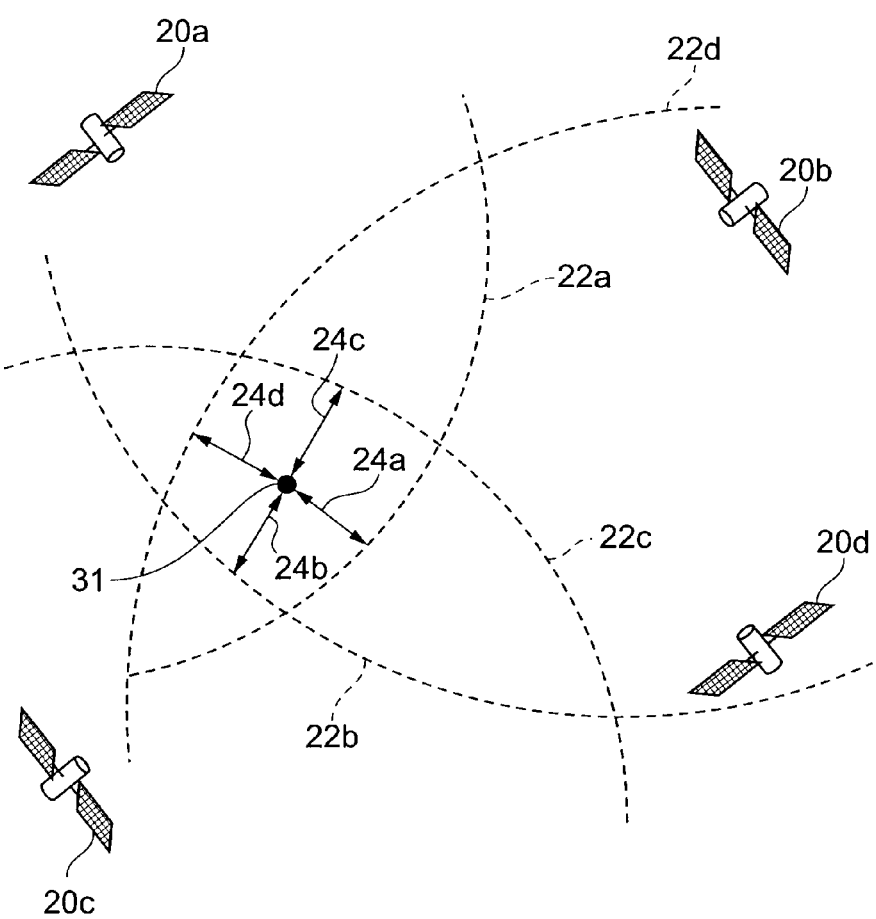
FIG. 6 illustrates the concept of a pseudo clock bias.

The differences between distances $r'_n$ from the receiver 10 to the GPS satellites 20*a* to 20*d*, calculated by the least-square method, and the calculated and corrected pseudo-distances $pr_n$ of the GPS satellites 20*a* to 20*d* are defined as pseudo clock biases. Here, $\Delta r_n = pr_n - r'_n$, where $\Delta r_n$ represents a pseudo clock bias. As shown in FIG. 6, the pseudo clock biases correspond to distances 24*a* to 24*d* from the spheres (circles) 22*a* to 22*d* having radii $pr_n$ and being centered at the positions of the GPS satellites 20*a* to 20*d* to the calculated position 31 of the receiver 10.

The pseudo clock biases $\Delta r_n$ can be calculated from the following equation, which is derived by changing $r_n$ in Equation (1) to $r'_n$:

$$\Delta r_n = clk' + \varepsilon'_n$$

Here, clk' represents a common component, such as the difference between each clock of the GPS satellites 20*a* to 20*d* and the clock of the receiver 10. $\varepsilon'_n$ represents a variable component (uncorrectable component) in the errors corresponding to $r'_n$. The closer $\varepsilon'_n$ is to zero, the more accurate the pseudo distance, and $\Delta r_n$ has an identical value among the GPS satellites 20*a* to 20*d*. In contrast, the farther $\varepsilon'_n$ is from zero, the more incorrect the pseudo-distances $pr_n$, and $\Delta r_n$ has a different value among the GPS satellites 20*a* to 20*d*. If the pseudo-distances $pr_n$ is incorrect, the calculated position of the receiver will differ from the actual position in many cases. In other words, the accuracy of the calculated position of the receiver 10 (i.e., GPS positioning accuracy) can be determined on the basis of the variation in the pseudo clock bias.

In GPS positioning, it is necessary to determine the positions of the GPS satellites 20 at the transmission time of the positioning signals. Usually, the positions of the GPS satellites 20 at a predetermined time within a certain range is calculated using the satellite orbit parameters contained in the navigation messages sent from the GPS satellites 20. In order to calculate the actual positions of the GPS satellites 20, therefore, accurate transmission times are necessary. Usually, transmission time information can be acquired from the navigation messages. However, if incorrect transmission time information (time of week (TOW)) is acquired due to, for example, a decrease in GPS signal intensity, errors occur in the calculated positions of the GPS satellites 20, thus causing a significant decrease in the accuracy of the GPS positioning.

Figure 5:
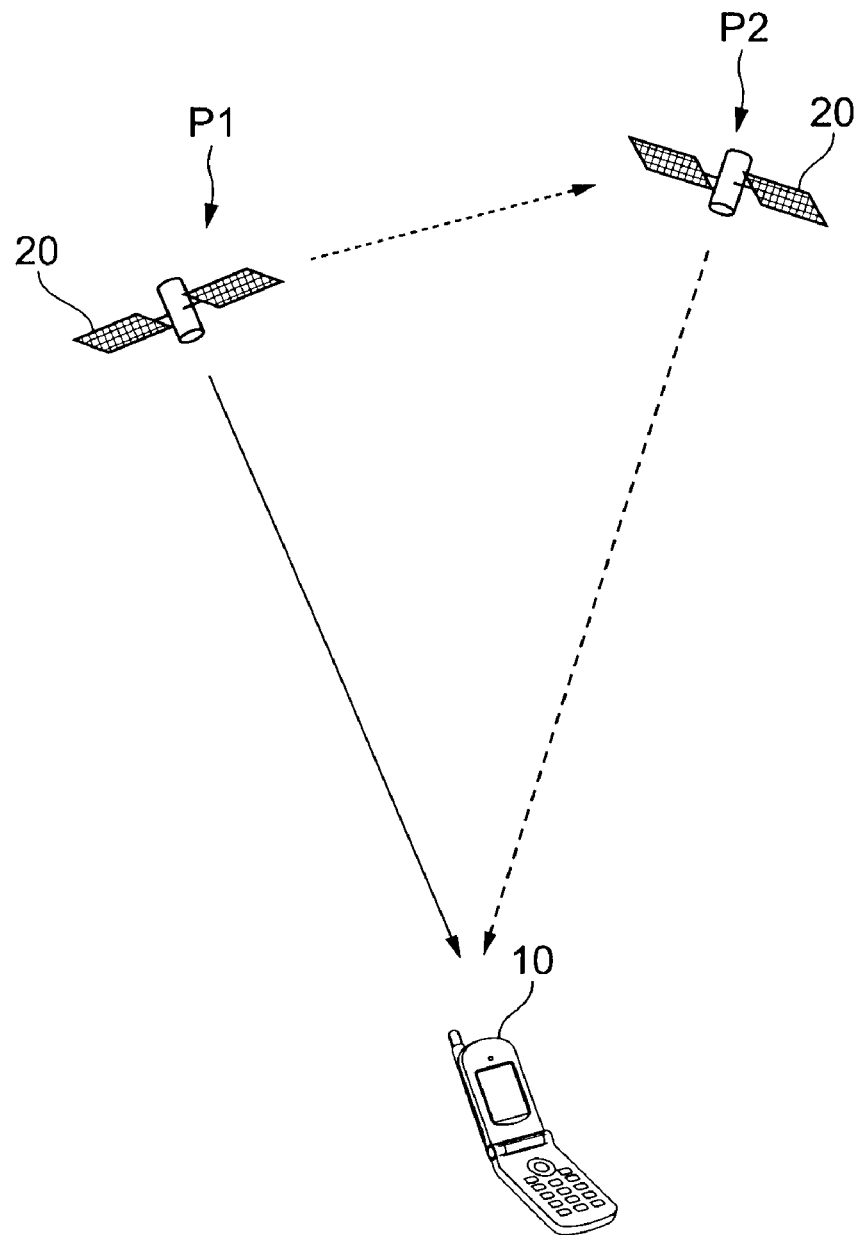
FIG. 5 illustrates the positions of a GPS satellite at different times.

As shown in FIG. 5, the GPS satellites 20 move at a velocity of several kilometers per second. If the transmission time information (TOW) is incorrect, positioning is performed based on the position P2, which differs from the position P1 where the GPS satellite 20 is actually positioned. As a result, the position of the receiver 10 will be calculated incorrectly. According to this embodiment, the above-described pseudo clock biases are used to evaluate the GPS positioning accuracy, resulting in avoidance such circumstance and accurate positioning.

The receiver 10 obtains the transmission time information (TOW) contained in the received navigation messages and determines the time range for search (search time period) and the interval of the searching steps on the basis of the time information. Subsequently, during the searching time, the receiver 10 calculates the position of each of the GPS satellites 20a to 20d at a plurality of transmission times (hereinafter referred to as "searching time") at each searching step from the satellite orbit parameters and other parameters. Then, the receiver 10 calculates the position of the receiver 10 at each transmission time on the basis of the positions of the GPS satellites 20a to 20d calculated at each transmission time and the pseudo-distance to the GPS satellites 20a to 20d.

Subsequently, the receiver 10 calculates the pseudo clock biases $\Delta r_n$ (TOW) for each transmission time on the basis of the position of the receiver 10 calculated at each transmission time. Then, the receiver 10 calculates a variation in the pseudo clock biases $\Delta r_n$ (TOW) at each transmission time. Methods employing variance and/or maximum difference to the average can be used to determine the variation in the pseudo clock biases. For instance, if variance $\sigma_{\Delta rn(TOW)}^2$ is used to represent the variation, the relationship between TOW and $\sigma_{\Delta rn (TOW)}^2$ can be plotted in a graph shown in FIG. 7, where the horizontal axis represents TOW and the longitudinal axis represents $\sigma_{\Delta rn(TOW)}^2$. The solid line $L_e$ represents a change in the pseudo clock bias including an error, and the dotted line $L_i$ represents a change in ideal pseudo clock bias including no error.

Figure 7:
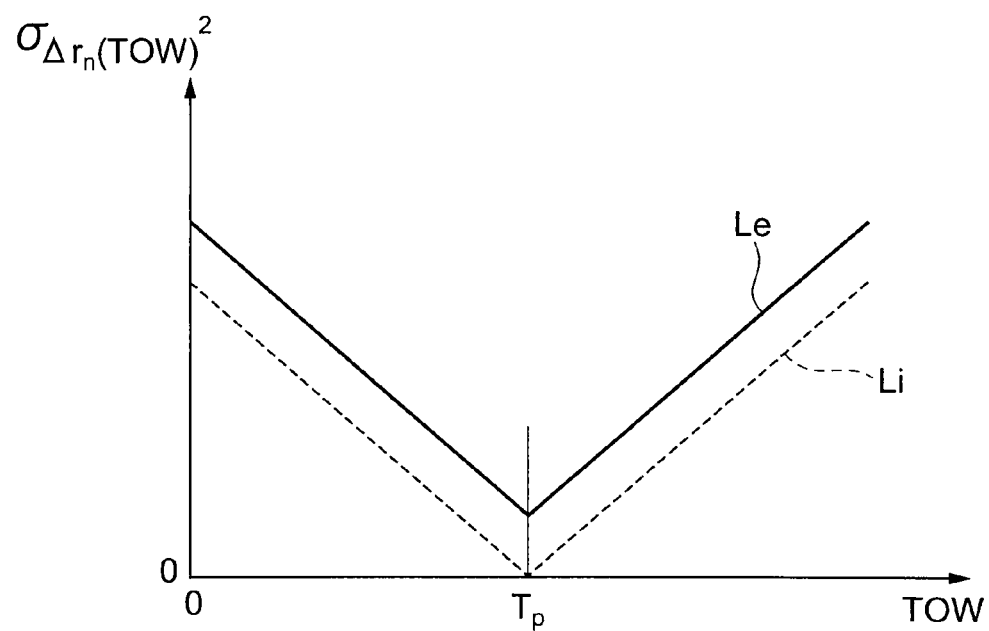
FIG. 7 is a graph illustrating the relationship between a TOW and the variance of a pseudo clock bias.

As shown in FIG. 7, if a correct transmission time $T_p$ is within the searching range, the GPS satellite 20 first approaches the position corresponding to that transmission time $T_p$ and then moves away. The positioning error first decreases as the correct transmission time $T_p$ approaches, and then increases as the time passes after the transmission time $T_p$. In other words, the positioning error is minimized at the correct transmission time $T_p$. Therefore, the time curve corresponding to the variance $\sigma_{\Delta rn(TOW)}^2$ of the pseudo clock biases $\Delta r_n$ (TOW), which represents the positioning error, is convex downward, as shown in FIG. 7, and has a minimum value at the correct transmission time $T_p$.

Therefore, the receiver 10 can set the time $T_p$ when the variance $\sigma_{\Delta rn(TOW)}^2$ of the pseudo clock biases $\Delta r_n$ (TOW) is a minimum value within the time range for search as the correct transmission time and determine the results of positioning at this transmission time $T_p$ as the final results of positioning. The results of positioning at transmission time $T_p$ may be calculated separately after searching for $T_p$, or during the search for $T_p$.

The correct transmission time $T_p$ can be derived from the pseudo clock biases because the relative positions of the GPS satellites 20a to 20d vary every transmission time. In other words, the velocity vectors (the movement altitudes and the movement distances in a unit time) of the GPS satellites 20a to 20d differ. As a result, the relative positions of the GPS satellites 20a to 20d vary every transmission time. For example, as shown in FIGS. 8A to 8C, if the velocity vectors $r_a$ to $r_d$ of the GPS satellites 20a to 20d differ from each other, the relative positions of the GPS satellites 20a to 20d vary at transmission times $t_1$ to $t_3$. As a result, the variance of the pseudo clock biases also varies every transmission time. Therefore, the receiver 10 can determine the transmission time $t_2$ when the pseudo clock biases are minimum values and can accurately calculate the position 31 of the receiver 10 on the basis of positions $P_a$ to $P_d$ of the GPS satellites 20a to 20d.

However, as shown in FIGS. 9A to 9C, if the velocity vectors $r_a$ to $r_d$ of the GPS satellites 20a to 20d are the same and, as a result, the relative positions of the GPS satellites 20a to 20d do not vary at the transmission times $t_1$ to $t_3$, the variance of the pseudo clock biases also does not vary. In such a case, the receiver 10 cannot determine the transmission time $t_2$ when the pseudo clock biases are minimum values. Therefore, the receiver 10 cannot calculate its position 31 on the basis of positions $P_a$ to $P_d$ of the GPS satellites 20a to 20d.

For this, a combination of satellites 20 that can determine the correct transmission time must be selected from the GPS satellites 20, which are the senders of the received signal. For example, the GPS satellites 20a to 20d, which are shown in FIGS. 8A to 8C, must be selected from at least five satellites 20.

Accordingly, in this embodiment, the receiver 10 calculates a plurality of velocity vectors of the GPS satellites 20. Then, the receiver 10 generates at least one combination of the velocity vectors from the calculated velocity vectors and selects a plurality of satellites 20 on the basis of the generated combination of velocity vectors.

Figure 8:
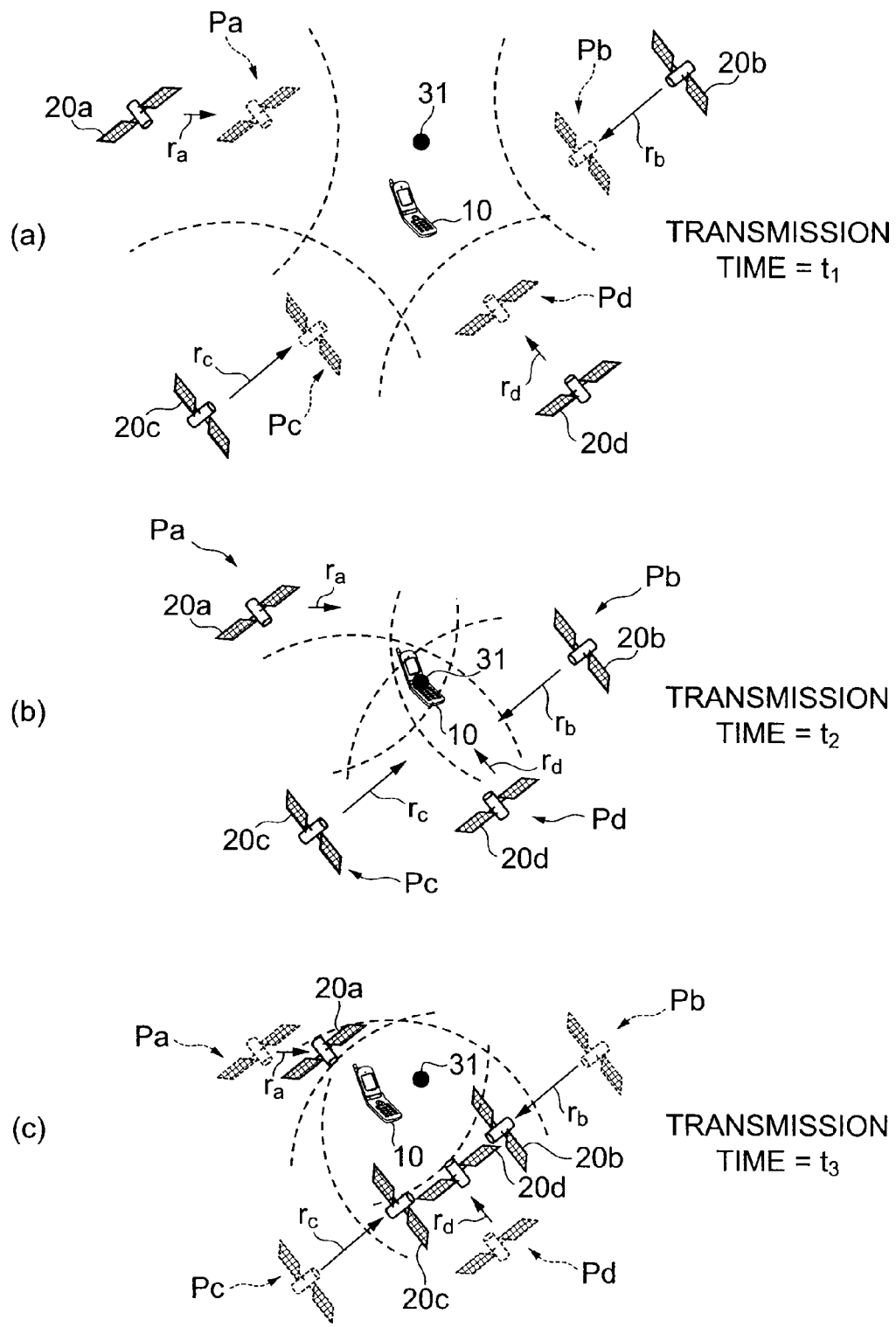
FIGS. 8A to 8C illustrate examples in which the relative positions of the GPS satellites change.
Figure 9:
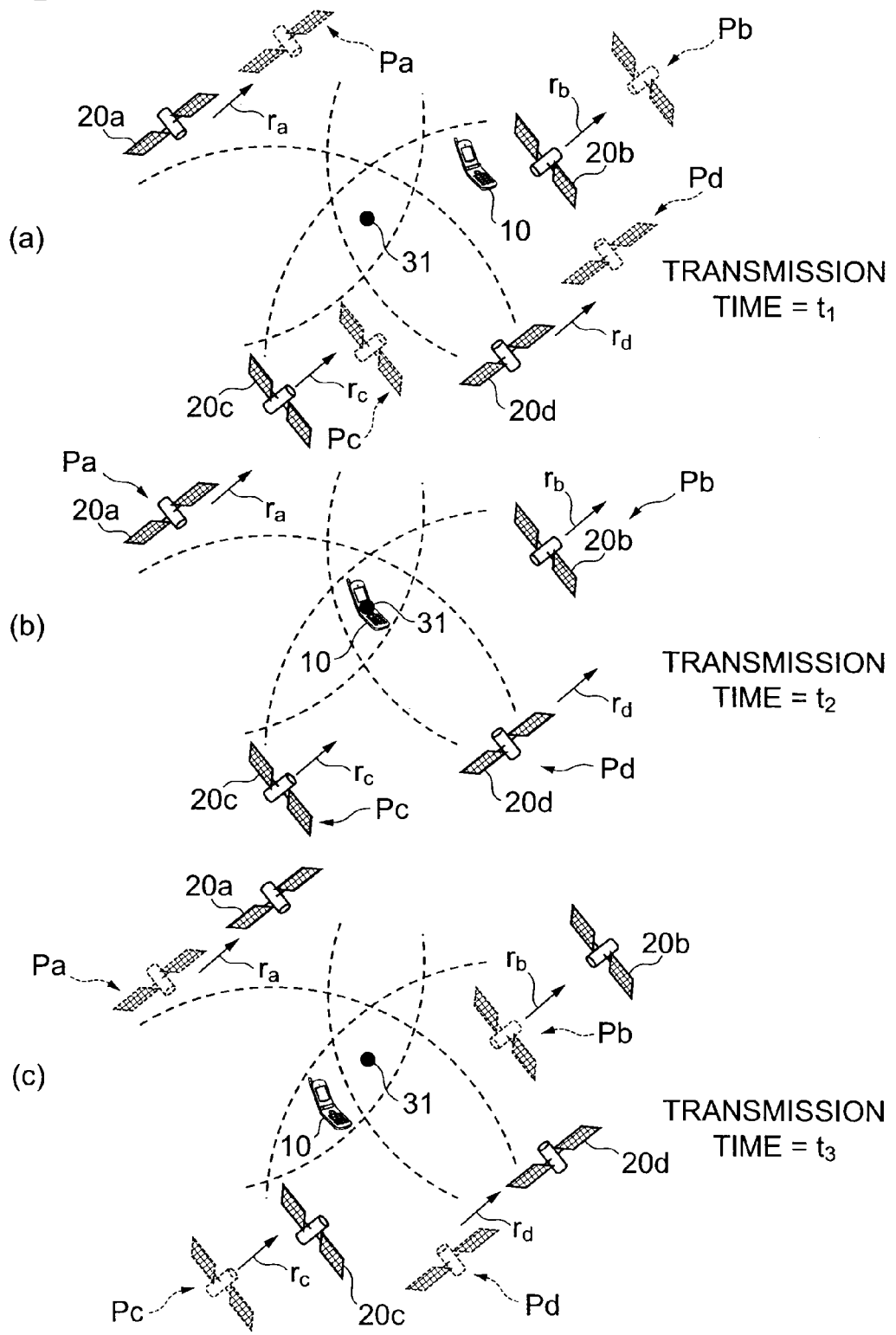
FIGS. 9A to 9C illustrate examples in which the relative positions of the GPS satellites do not change.
Figure 10:
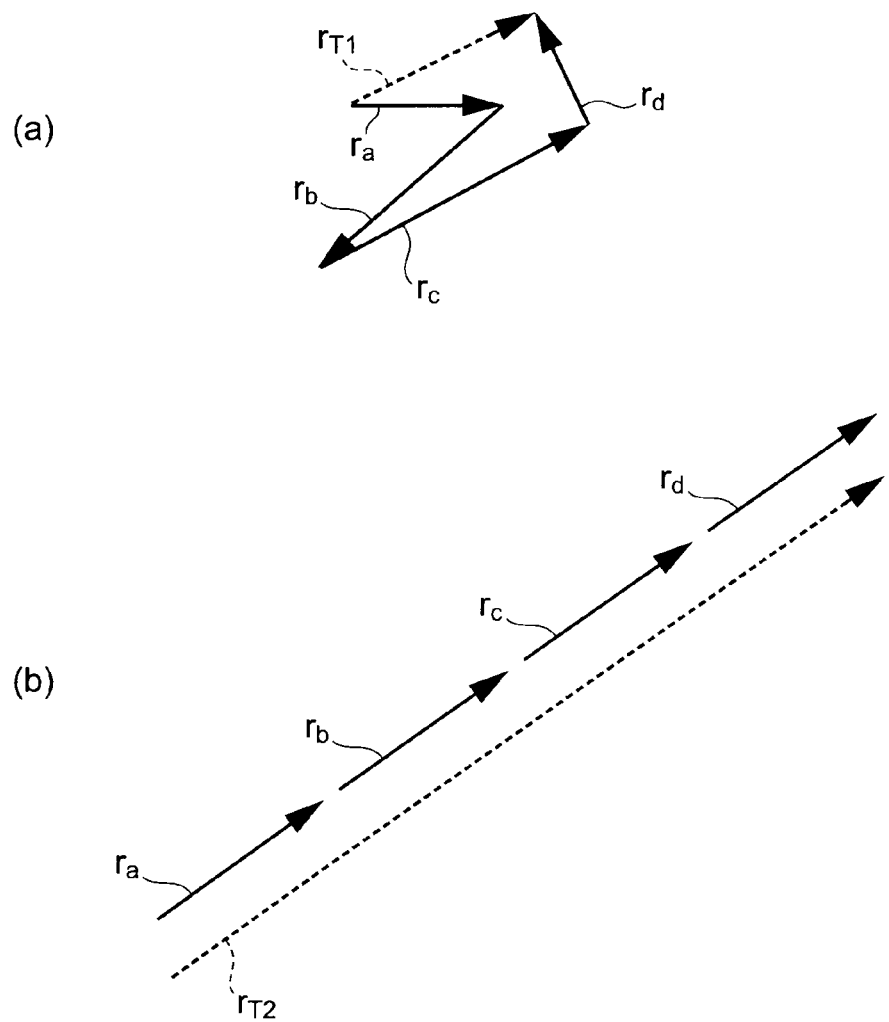
FIGS. 10A and 10B illustrates the concept of sum of velocity vectors, FIG. 10A corresponding to FIGS. 8A to 8C, while FIG. 10B corresponding to FIGS. 9A to 9C.

Although there are several possible methods of selecting the GPS satellites 20 on the basis of a combination of velocity vectors, here, a method of selecting the GPS satellites 20 on the basis of the sum of the velocity vectors (vector sum) will be briefly described as an example. The receiver 10 that has generated the combination of transmission vectors calculates the sum of the velocity vectors (vector sum) for each combination. A smaller vector sum leads to higher possibility that the relative position of the GPS satellites 20 corresponding to the velocity vectors included in the combination will vary every transmission time. For example, in the case that the relative positions of the GPS satellites 20 vary as shown in FIG. 8, the vector sum $r_{T1}$ is relatively small, as shown in FIG. 10A. In contrast, in the case that the relative positions of the GPS satellites 20 do not vary as shown in FIG. 9, the vector sum $r_{T2}$ is large, as shown in FIG. 10B.

Finally, the receiver 10 selects a plurality of satellites 20 corresponding to the combination having the smallest vector sum. In this way, the receiver 10 can determine the correct transmission time leading to minimum pseudo clock biases and calculate its position at the correct transmission time. Consequently, the user of the receiver 10 can acquire a highly accurate current position.

Figure 11:
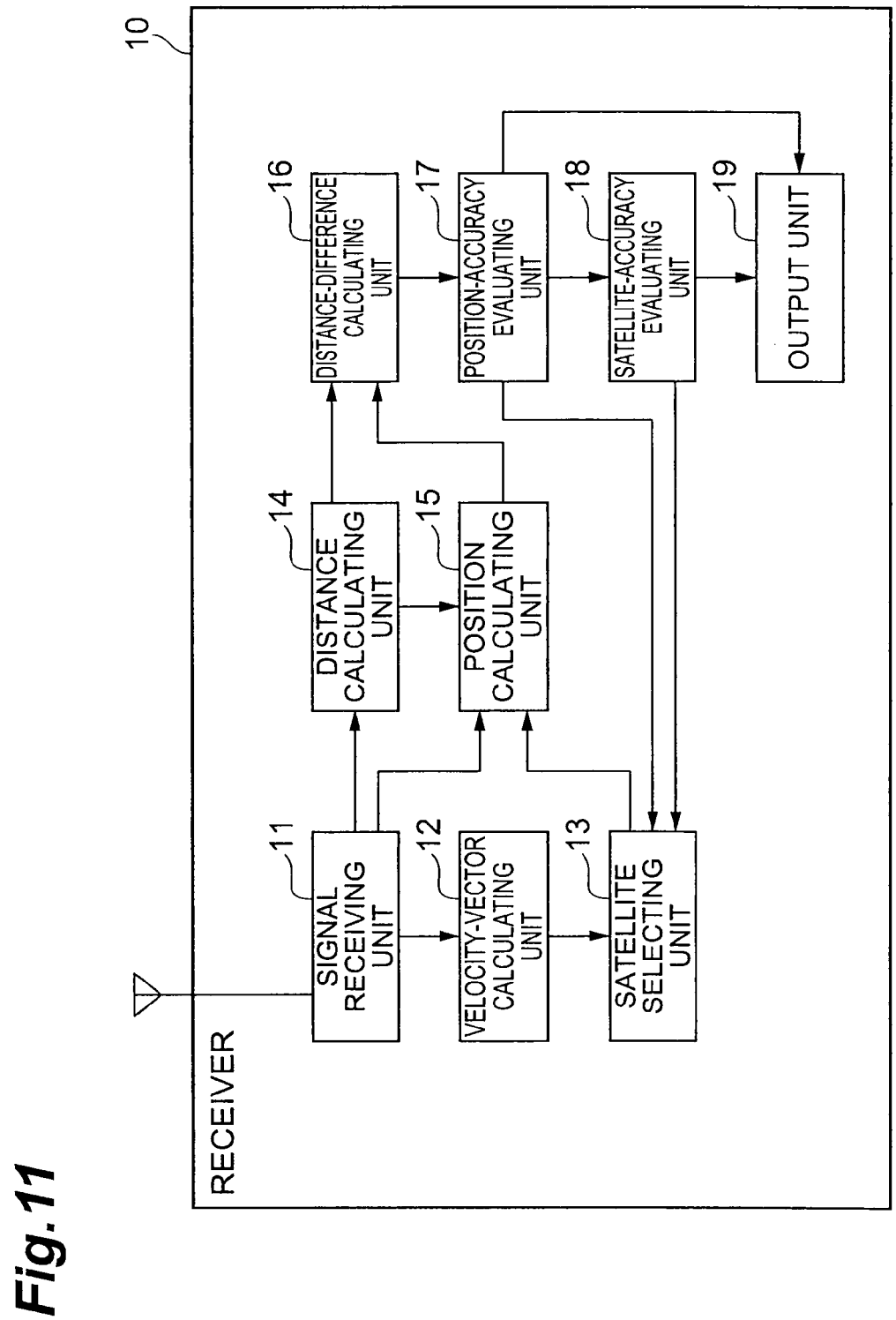
FIG. 11 illustrates a functional configuration of the receiver shown in FIG. 1.
Figure 12:
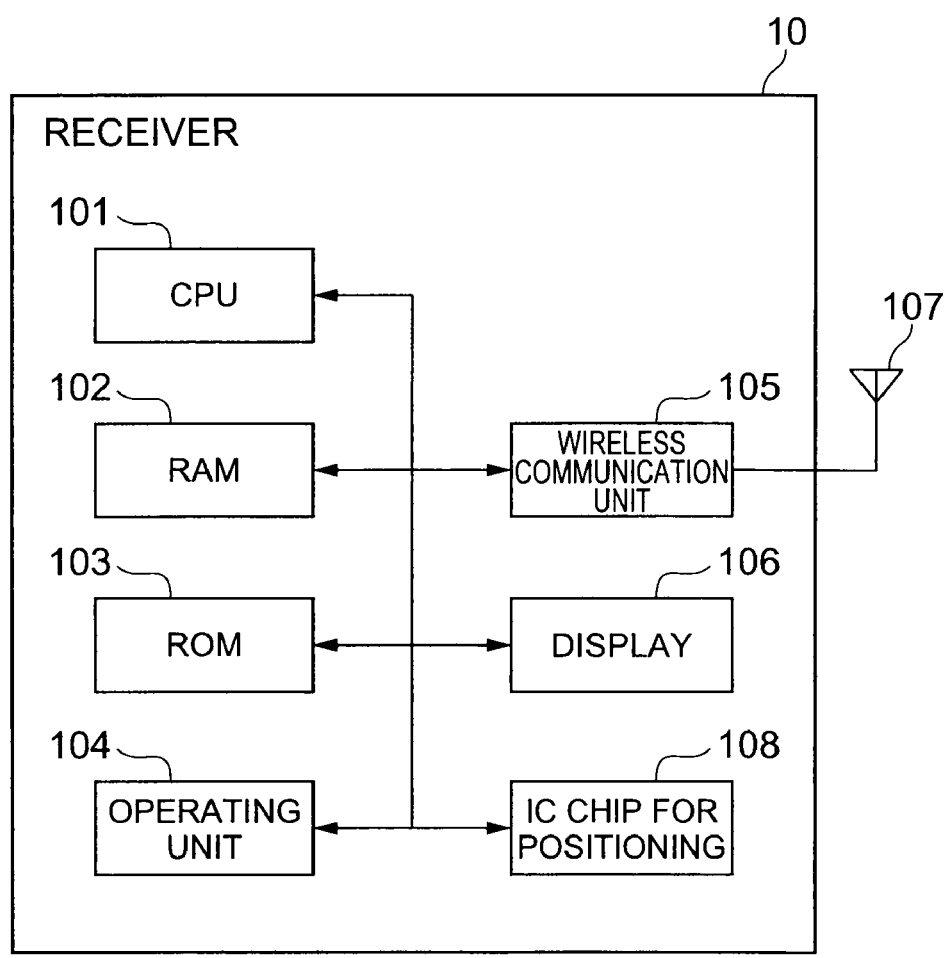
FIG. 12 illustrates a hardware configuration of the receiver shown in FIG. 1.

Next, the functional configuration of the receiver 10, which is the positioned object and the main component used for positioning, will be described with reference to FIGS. 11 and 12. FIG. 11 illustrates a functional configuration of the receiver 10 shown in FIG. 1. FIG. 12 illustrates a hardware configuration of the receiver 10. In the description below, it is presumed that the calculated pseudo-distance $pr_n$ is a value in which $\beta_n$ has already corrected.

As shown in FIG. 11, the receiver 10 includes a signal receiving unit 11, a velocity-vector calculating unit 12, a satellite selecting unit 13, a distance calculating unit 14, a position calculating unit 15, a distance-difference calculating unit 16, a position-accuracy evaluating unit 17, a satellite-accuracy evaluating unit 18, and an output unit 19. The receiver 10 may also have a function of mobile communication, as described above.

As shown in FIG. 12, the receiver 10 includes a central processing unit (CPU) 101, a random access memory (RAM) 102, a read only memory (ROM) 103, an operating unit 104, a wireless communication unit 105, a display 106, an antenna 107, and a IC chip 108 for positioning. The functions of the units illustrated in FIG. 11 are provided by the operation of these hardware. In particular, the IC chip 108 functions as the velocity-vector calculating unit 12, the satellite selecting unit 13, the distance calculating unit 14, the position calculating unit 15, the distance-difference calculating unit 16, the position-accuracy evaluating unit 17, and the satellite-accuracy evaluating unit 18. The receiver 10 may not include the IC chip 108 and the functions of the units illustrated in FIG. 11 may be provided by other hardware (e.g., the CPU 101, the RAM 102, or the ROM 103).

Referring back to FIG. 11, the signal receiving unit 11 is means for receiving signals sent from the GPS satellites 20. The signal receiving unit 11 outputs the information contained in the received signals to the velocity-vector calculating unit 12, the distance calculating unit 14, and the position calculating unit 15. The signal receiving unit 11 functions as a clock and outputs information about the reception time of the positioning signals, together with the above-mentioned information, to the distance calculating unit 14. The signal receiving unit 11 receives signals from a plurality of GPS satellites 20.

The velocity-vector calculating unit 12 is velocity-vector calculating means for calculating the velocity vectors of the GPS satellites 20 on the basis of signals sent from the GPS satellites 20 and received by the signal receiving unit 11. The velocity-vector calculating unit 12 outputs the calculated velocity vectors of the GPS satellites 20 to the satellite selecting unit 13.

Although there are several methods of calculating a velocity vector, here, a method of calculating a velocity vector of a GPS satellite at a time t from satellite orbit parameters will be described below.

The semimajor axis of the ellipsoidal orbit of a satellite 20, the eccentricity of the orbit, the orbital inclination, the right ascension of ascending node, and the argument of perigee are represented by a, e, i, $\Omega$, and $\omega$, respectively. The velocity-vector calculating unit 12, first, calculates the average motion n indicating the average angular velocity of the GPS satellites 20 using the following equation:

$$n = \sqrt{\frac{\mu_e}{a^3}}$$ [Math 2]

where $\mu_c$ represents the gravitational constant of the earth.

Next, the velocity-vector calculating unit 12 calculates the mean anomaly M using the following equation:

$$M = n(t - t_p)$$

where $t_p$ represents the time when the GPS satellite 20 passes a perigee (a point at which the GPS satellite 20 is closest to the earth).

Then, the velocity-vector calculating unit 12 calculates the eccentric anomaly E by substituting the mean anomaly M to the following Kepler's equation:

$$M = E - e \cdot \sin E$$

Then, the velocity-vector calculating unit 12 calculates the velocity vector r of the GPS satellite 20 in an orbital-surface coordinate system using the following equation:

$$r = \begin{bmatrix} x \\ y \\ z \end{bmatrix} = \frac{na}{1 - e \cdot \cos E} \begin{bmatrix} -\sin E \\ \sqrt{1 - e^2} \cos E \\ 0 \end{bmatrix}$$ [Math 3]

Then, the velocity-vector calculating unit 12 converts the calculated velocity vector r in the orbital surface coordinate to a velocity vector in an inertial coordinate system using the following equation:

$$r_1 = R_z(-\Omega) R_x(i) R_z(-\omega) r$$

where $R_z(\alpha)$ represents a vector rotating the z axis of the inertial coordinate system by an angle $\alpha$, and $R_x(\alpha)$ represents a vector rotating the x axis of the inertial coordinate system by an angle $\alpha$.

Then, the velocity-vector calculating unit 12 converts the velocity vector $r_1$ in the inertial coordinate system to a velocity vector in an ECEF coordinate system using the following equation:

$$r_T = R_z(\theta) r_1$$

In this way, the velocity-vector calculating unit 12 acquires a velocity vector $r_T$ in the ECEF coordinate system at a time t. The velocity-vector calculating unit 12 stores a program that enables such a series of calculation in advance and reads out the program, if necessary to calculate the velocity vector $r_T$ of a GPS satellite 20 in the ECEF coordinate system. Hereinafter, the velocity vector $r_T$ in the ECEF coordinate system may be indicated by X(x, y, z).

The velocity-vector calculating unit 12 may calculate a velocity vector by other methods. For example, the velocity-vector calculating unit 12 may calculate a velocity vector based on the variation over time in the position of the GPS satellite 20.

The satellite selecting unit 13 is a signal-source selecting means for generating a combination of velocity vectors from a plurality of velocity vectors calculated by the velocity-vector calculating unit 12 and selecting a combination of GPS satellites 20 from a plurality of GPS satellites, which are the senders of the signals received by the signal receiving unit 11. The satellite selecting unit 13 outputs satellite selecting information about the selected GPS satellites 20 to the position calculating unit 15.

The method of selecting the GPS satellites 20 is not limited to a single method. Several methods of selecting the GPS satellites 20 are described below.

First, a first method will be described. With the first method, the satellite selecting unit 13 generates a combination C of an m number of input velocity vectors $X_1$ ($x_1, y_1, z_1$) to $X_m$ ($x_m, y_m, z_m$). Then, the satellite selecting unit 13 calculates the vector sum of the three dimensional vectors of the generated combination C and determines whether the magnitude of the vector sum is smaller than or equal to a predetermined threshold value $TH_a$. If the magnitude of the vector sum is smaller than or equal to the predetermined threshold value $TH_a$, the satellite selecting unit 13 selects an m number of GPS satellites 20 corresponding to the m number of input velocity vectors as signal transmitters used for estimation of position.

The vector sum v of the m number of input velocity vectors is represented by the following equation:

[Math 4]

$$v = \left( \sum_{i=1}^{m} x_i, \sum_{i=1}^{m} y_i, \sum_{i=1}^{m} z_i \right)$$ (2)

The magnitude (norm) of the vector sum v is represented by $\|v\|$. If $\|v\| \leq TH_a$, the satellite selecting unit 13 selects an m number of GPS satellites 20.

The method of calculating the vector sum is not limited to the method indicated by Equation (2). For example, the satellite selecting unit 13 convert all of the m number of input velocity vectors $X_1$ ($x_1$, $y_1$, $z_1$) to $X_m$ ($x_m$, $y_m$, $z_m$) to vectors in a local rectangular coordinate system and calculate the vector sum of two-dimensional velocity vectors based on the converted velocity vectors. More specifically, the satellite selecting unit 13 uses the following equation to calculate the vector sum v' of the two-dimensional velocity vectors:

[Math 5]

$$v' = \left( \sum_{i=1}^{m} x'_i, \sum_{i=1}^{m} y'_i \right) \quad (3)$$

where the converted velocity vectors are represented by $X'_1$ ($x'_1$, $y'_1$, $z'_1$) to $X'_m$ ($x'_m$, $y'_m$, $z'_m$).

The magnitude of the vector sum $\|v'\|$ is represented by $\|v'\|$. The satellite selecting unit 13 compares a predetermined threshold value $TH'_a$ with the norm $\|v'\|$. If $\|v'\| \leq TH'_a$, the satellite selecting unit 13 selects an m number of GPS satellites 20.

Next, a second method will be described. In this method, the satellite selecting unit 13 generates combinations each including a number of velocity vectors less than the number of input velocity vectors, calculates the vector sum of each combination, and selects GPS satellites 20 corresponding to the velocity vectors constituting the smallest vectors sum among the calculated vectors sums. In other words, the satellite selecting unit 13 selects a limited number of GPS satellites 20 used for positioning in order to more accurately calculate the position of the receiver 10. The method of setting the number of GPS satellites 20 is not limited. For example, the number may be stored in the satellite selecting unit 13 in advance and read out if necessary, or the number of the GPS satellites 20 may be set on the basis of information input from another component.

As an example, a case in which six velocity vectors $X_1$ ($x_1$, $y_1$, $z_1$) to $X_6$ ($x_6$, $y_6$, $z_6$) are input to the satellite selecting unit 13 and the satellite selecting unit 13 selects five GPS satellites 20 from six GPS satellites 20a to 20f will be described below. The velocity vectors $X_1$ to $X_6$ correspond to the GPS satellites 20a to 20f, respectively. In this case, the satellite selecting unit 13 first generates a combination including five velocity vectors. In other words, the satellite selecting unit 13 generates a combination of five GPS satellites 20 corresponding to five velocity vectors. The number of combinations generated by the satellite selecting unit 13 is $_6C_5=6$. More specifically, the satellite selecting unit 13 generates combinations $C_n$ (n=1 to 6) of the following velocity vectors:

$C_1=(X_1,X_2,X_3,X_4,X_5)$
$C_2=(X_1,X_2,X_3,X_4,X_6)$
$C_3=(X_1,X_2,X_3,X_5,X_6)$
$C_4=(X_1,X_2,X_4,X_5,X_6)$
$C_5=(X_1,X_3,X_4,X_5,X_6)$
$C_6=(X_2,X_3,X_4,X_5,X_6)$

Then, the satellite selecting unit 13 calculates the vector sum $v_n$ (n=1 to 6) for each of the $C_n$ combinations of velocity vectors by Equation (2) and calculates the magnitude $\|v_n\|$ of the vector sums. Then, the satellite selecting unit 13 derives the combination of velocity vectors having the smallest vector sum and selects the GPS satellites 20 corresponding to the derived combination. For example, if $\|v_3\|$ is the smallest among $\|v_n\|$ (n=1 to 6), the satellite selecting unit 13 selects the GPS satellites 20a, 20b, 20c, 20e, and 20f, corresponding to the combination $C_3$.

The satellite selecting unit 13 may apply the vector sum of two-dimensional vectors to the second method. The number of GPS satellites 20 selected by the satellite selecting unit 13 in a single process is not limited. The satellite selecting unit 13 may select four GPS satellites 20 based on six velocity vectors or may select one GPS satellite 20 based on two velocity vectors.

Next, a third method will be described. In this method, the satellite selecting unit 13 selects GPS satellites 20 by evaluating the variation in the directions of the velocity vectors, the variation in the magnitudes of the velocity vectors, or the variations in both the directions of the velocity vectors and the magnitudes of the velocity vectors.

As an example, the satellite selecting unit 13 generates combination C consisted of an m number of input vectors $X_1$ ($x_1$, $y_1$, $z_1$) to $X_m$ ($x_m$, $y_m$, $z_m$). Next, the satellite selecting unit 13 converts the m number of input vectors $X_1$ ($x_1$, $y_1$, $z_1$) to $X_m$ ($x_m$, $y_m$, $z_m$) to vectors in a local rectangular coordinate system and acquires velocity vectors $X'_1$ ($x'_1$, $y'_1$, $z'_1$) to $X'_m$ ($x'_m$, $y'_m$, $z'_m$) in the local rectangular coordinate system. Then, the satellite selecting unit 13 calculates two-dimensional velocity directions $\theta_i$ for each converted velocity vector by the following equation:

$$\theta_i = \tan^{-1}(y'_i/x'_i)(i=1 \text{ to } m) \quad (4)$$

Then, the satellite selecting unit 13 evaluates the variation in the calculated two-dimensional velocity directions for the generated combination C. The satellite selecting unit 13 evaluates the variation in the calculated two-dimensional velocity directions on the basis of, for example, sample variance or the maximum difference from the average value.

When sample variance is used to evaluate the variation, the satellite selecting unit 13 uses the following equation to calculate an evaluation value h for the combination of velocity vectors:

[Math 6]

$$h = \sigma_\theta^2 \quad (5)$$
$$= \frac{1}{m} \sum_{i=1}^{m} \left( \theta_i - \frac{1}{m} \sum_{j=1}^{m} \theta_j \right)^2$$

Alternatively, when the maximum difference from the average value is used to evaluate the variation, the satellite selecting unit 13 uses the following equation to calculate an evaluation value h for the combination of velocity vectors:

[Math 7]

$$h = \text{MAX}_{i=1}^{m} \left\| \theta_i - \frac{1}{m} \sum_{j=1}^{m} \theta_j \right\| \quad (6)$$

The satellite selecting unit 13 calculates the evaluation value h using one of the methods. The evaluation value h represents a variation in the combination C. Subsequently, the satellite selecting unit 13 determines whether the evaluation value h is greater than or equal to a predetermined threshold value $TH_c$. If $h \geqq TH_c$, the satellite selecting unit 13 selects an m number of GPS satellites 20 corresponding to the m number of velocity vectors.

The satellite selecting unit 13 performs the same calculation when the GPS satellites 20 are selected on the basis of the variation in the magnitudes of the velocity vectors. If the evaluation value representing the variation is greater than or equal to a predetermined threshold value, an m number of GPS satellites 20 are selected. Alternatively, the satellite selecting unit 13 may select an m number of GPS satellites 20 when the sum of an evaluation value representing the variation in the directions of the velocity vectors and an evaluation value representing the variation in the magnitudes of the velocity vectors is greater than or equal to a predetermined threshold value.

Next, a fourth method will be described. In this method, the satellite selecting unit 13 applies the third method to select a limited number of GPS satellites 20 to be used for positioning. However, the satellite selecting unit 13 selects the GPS satellites 20 on the basis of a variation in the velocity vectors, instead of a vector sum.

As an example, a case in which six velocity vectors $X_1$ ($x_1$, $y_1$, $z_1$) to $X_6$ ($x_6$, $y_6$, $z_6$) are input to the satellite selecting unit 13 and the satellite selecting unit 13 selects five GPS satellites 20 from six GPS satellites 20a to 20f will be described below. The velocity vectors $X_1$ to $X_6$ correspond to the GPS satellites 20a to 20f, respectively. In this case, the satellite selecting unit 13 first converts the six velocity vectors $X_1$ ($x_1$, $y_1$, $z_1$) to $X_6$ ($x_6$, $y_6$, $z_6$) to velocity vectors $X'_1$ ($x'_1$, $y'_1$, $z'_1$) to $X'_6$ ($x'_6$, $y'_6$, $z'_6$) in a local rectangular coordinate system. Then, the satellite selecting unit 13 calculates the two-dimensional velocity directions of each converted velocity vector by Equation (4).

Then, the satellite selecting unit 13 generates $C_n$ (n=1 to 6) combinations of the following five velocity vectors:

$C_1 = (X_1, X_2, X_3, X_4, X_5)$
$C_2 = (X_1, X_2, X_3, X_4, X_6)$
$C_3 = (X_1, X_2, X_3, X_5, X_6)$
$C_4 = (X_1, X_2, X_4, X_5, X_6)$
$C_5 = (X_1, X_3, X_4, X_5, X_6)$
$C_6 = (X_2, X_3, X_4, X_5, X_6)$

Subsequently, the satellite selecting unit 13 calculates evaluation values $h_n$ (n=1 to 6) of the variations in the $C_n$ (n=1 to 6) combinations of the velocity vectors by Equation (5) or (6).

When a limited number of GPS satellites 20 is selected on the basis of only the directions of the velocity vectors, the satellite selecting unit 13 selects GPS satellites 20 that correspond to the combination having the maximum evaluation value. For example, if the evaluation value $h_5$ is greater than the other evaluation values, the satellite selecting unit 13 selects the GPS satellites 20a, 20c, 20d, 20e, and 20f. When a limited number of GPS satellites 20 is selected on the basis of only the variation in the magnitudes of the velocity vectors, the satellite selecting unit 13 carries out the same process.

Alternatively, in the case of the GPS satellites 20 selected on the basis of the variations in the directions and magnitudes of the velocity vectors, the satellite selecting unit 13 calculates evaluation values $ha_n$ that represent the variation in the direction of the velocity vectors and numbers the combinations $C_n$ from 1 to 6 in the order from the minimum value to the maximum value. Furthermore, the satellite selecting unit 13 calculates evaluation values $hb_n$ that represent variation in the magnitudes of the velocity vectors and numbers the combinations $C_n$ from 1 to 6 in the order from the minimum value to the maximum value. Then, the satellite selecting unit 13 calculates the sum of the numbers for each of the combinations $C_n$ and selects the GPS satellites 20 that correspond to the combination having the greatest sum.

For example, if the evaluation values $ha_n$ have a relationship $ha_3 < ha_4 < ha_5 < ha_6 < ha_1 < ha_2$ and the evaluation values $hb_n$ have a relationship $hb_4 < hb_5 < hb_1 < hb_2 < hb_6 < hb_3$, the sums of the numbers assigned to the combinations $C_n$ are as follows:

$C_1 \ldots 5+3=8$ $C_2 \ldots 6+4=10$ $C_3 \ldots 1+6=7$ $C_4 \ldots 2+1=3$ $C_5 \ldots 3+2=5$ $C_6 \ldots 4+5=9$ In such a case, the satellite selecting unit 13 selects GPS satellites 20a, 20b, 20c, 20d, and 20f corresponding to the combination $C_2$. Also, in this fourth method, the number of GPS satellites 20 selected by the satellite selecting unit 13 in a single process is not limited. For example, the satellite selecting unit 13 may select four GPS satellites 20 based on six velocity vectors or may select nine GPS satellites 20 based on ten velocity vectors.

To carry out the above-described functions, a program for selecting the GPS satellites 20 (e.g. a program for performing the first method) is stored in the satellite selecting unit 13 in advance and is read out if necessary.

The distance calculating unit 14 is means for calculating the distance between each GPS satellite 20 and the receiver 10 on the basis of information input from the signal receiving unit 11. The distance calculating unit 14 calculates the time difference based on the signal transmission time included in the information input from the signal receiving unit 11 and information about the reception time and calculates the pseudo-distance by multiplying the calculated time difference by the speed of light. The distance calculating unit 14 calculates the pseudo-distance for each GPS satellite 20 on the basis of the identification information of each GPS satellite 20. For this reason, a program for calculating the pseudo-distance is stored in the distance calculating unit 14 in advance and is read out if necessary. The method of calculating such distance is not limited, and may be any method including existing methods. The distance calculating unit 14 outputs information indicating the calculated distances to the position calculating unit 15 and the distance-difference calculating unit 16.

The position calculating unit 15 is position calculating means for calculating the position of the receiver 10 on the basis of signals sent from GPS satellites 20 selected by the satellite selecting unit 13 and received by the signal receiving unit 11 at the time each signal is sent. More specifically, the position calculating unit 15 determines the positions of the GPS satellites 20 indicated by the satellite selecting information input from the satellite selecting unit 13 on the basis of orbit information and transmission time information of the GPS satellites 20 input from the signal receiving unit 11. Then, the position calculating unit 15 calculates the position of the receiver 10 using the determined positions of the GPS satellites 20.

First, the position calculating unit 15 determines the GPS satellites 20 of which positions are to be specified on the basis of the satellite selecting information input from the satellite selecting unit 13. For example, if the information input from the signal receiving unit 11 relates to six GPS satellites 20a to 20f and the satellite selecting information input from the satellite selecting unit 13 indicates the GPS satellites 20a to 20d, the position calculating unit 15 determines to specify the positions of only the GPS satellites 20a to 20d.

Subsequently, the position calculating unit 15 uses the transmission time information to determine the searching time period and the interval of the searching step. For example, the position calculating unit 15 sets the searching time period to a range of several seconds to several tens of seconds (e.g., five seconds) centered at the time indicated by the transmission time information and sets the interval of the searching step to several microseconds to several hundred microseconds (e.g., 100 ms). For this, a program for setting the searching time period and the interval of the searching step is stored in the position calculating unit 15 in advance.

Subsequently, the position calculating unit 15 calculates the position of the target GPS satellite 20 on the basis of the satellite orbit parameters and other parameters at each time (searching time) in each searching step in the searching time period. Then, the position calculating unit 15 calculates the position of the receiver 10 at each searching time by, for example, a least-square method algorithm, on the basis of the positions of the GPS satellites 20 calculated at each searching time and information about the pseudo-distances input from the distance calculating unit 14. The position calculating unit 15 calculates information indicating the positions of the GPS satellites 20 and the receiver 10 as coordinates representing the longitudes and latitudes (and altitude, for the GPS satellites 20). The position calculating unit 15 outputs the information indicating the positions of the receiver 10 and the GPS satellites 20 calculated at each searching time to the distance-difference calculating unit 16.

The distance-difference calculating unit 16 is means for calculating the distances $r'_n$ between the receiver 10 and the GPS satellites 20 on the basis of the positions of the receiver 10 and the GPS satellites 20 input from the position calculating unit 15 and calculating the differences $\Delta r_n$ between the distances $r'_n$ and the pseudo-distances $pr_n$ input from the distance calculating unit 14 for each GPS satellite 20. Since the positions of the receiver 10 and the GPS satellites 20 calculated at each searching time are input from the position calculating unit 15, the distance-difference calculating unit 16 calculates pseudo clock biases $\Delta r_n(TOW)$ at each searching time. The distance-difference calculating unit 16 outputs the calculated pseudo clock biases $\Delta r_n(TOW)$ to the position-accuracy evaluating unit 17.

The position-accuracy evaluating unit 17 is transmission-time setting means for evaluating the accuracy of the positions of the receiver 10 calculated by the position calculating unit 15 and setting one of the times corresponding to the positions as the transmission time. The position-accuracy evaluating unit 17 is also estimated-position setting means for setting the position of the receiver 10 corresponding to the set transmission time as an estimated position of the receiver 10.

More specifically, the position-accuracy evaluating unit 17 calculates the variation in the pseudo clock biases $\Delta r_n(TOW)$ for the GPS satellites 20a to 20d input from the distance-difference calculating unit 16 at each searching time and evaluates the accuracy of the position of the receiver 10 calculated by the position calculating unit 15 on the basis of the calculated variation. The position-accuracy evaluating unit 17 uses variances $\sigma_{\Delta rn(TOW)}^2$ of the pseudo clock biases $\Delta r_n(TOW)$ as values representing the variation. Then, the position-accuracy evaluating unit 17 sets the time when the variances $\sigma_{\Delta rn(TOW)}^2$ of the pseudo clock biases $\Delta r_n(TOW)$ is the smallest value during the searching time period as the correct transmission time $T_p$. The position-accuracy evaluating unit 17 determines the positioning result at the correct transmission time $T_p$ as the final result. In other words, the position-accuracy evaluating unit 17 sets the position of the receiver 10 corresponding to the correct transmission time $T_p$ as the estimated position of the receiver 10. The position of the receiver 10 corresponding to the correct transmission time $T_p$ is the positioning result calculated on the basis of the correct transmission time $T_p$ by the position calculating unit 15.

Hereinafter, the pseudo clock biases corresponding to the transmission time $T_p$ are represented by $\Delta r_n(T_p)$, and the variances of the pseudo clock biases corresponding to the transmission time $T_p$ is represented by $\sigma_{\Delta rn(Tp)}^2$.

Subsequently, the position-accuracy evaluating unit 17 evaluates the accuracy of the position of the receiver 10 on the basis of the variances $\sigma_{\Delta rn(Tp)}^2$. For this, a program for evaluation is stored in the position-accuracy evaluating unit 17 and read out if necessary.

For example, the position-accuracy evaluating unit 17 evaluates that the accuracy of the calculated position of the receiver 10 is low when the variances $\sigma_{\Delta rn(Tp)}^2$ are greater than a predetermined threshold value and evaluates that the accuracy of the calculated position of the receiver 10 is high when the variances $\sigma_{\Delta rn(Tp)}^2$ are smaller than the predetermined threshold value. Furthermore, the position-accuracy evaluating unit 17 may use the variances $\sigma_{\Delta rn(Tp)}^2$ as values indicating the accuracy of the calculated position of the receiver 10 (i.e., values indicating the level of deviation of the calculated position from the actual position of the receiver 10). In such a case, small values of the variances $\sigma_{\Delta rn(Tp)}^2$ indicate high accuracy of the position of the receiver 10. The position-accuracy evaluating unit 17 may be configured such that the level of deviation of the calculated position from the actual position of the receiver 10 is estimated by multiplying a factor tuned in advance by the variances $\sigma_{\Delta rn(Tp)}^2$.

The position-accuracy evaluating unit 17 outputs the variances $\sigma_{\Delta rn(Tp)}^2$ and the positioning result (the estimated position of the receiver 10 set as the positioning result) at the correct transmission time $T_p$ to the satellite-accuracy evaluating unit 18. Separately, information about the evaluation performed by the position-accuracy evaluating unit 17 is used appropriately at the receiver 10.

For example, if the position-accuracy evaluating unit 17 evaluates the accuracy as being high (if a result indicating a level of accuracy higher than a predetermined level is acquired), the position-accuracy evaluating unit 17 outputs the positioning result (information about the position of the receiver 10 calculated by the position calculating unit 15) to the output unit 19. At this time, the position-accuracy evaluating unit 17 may output information about the evaluation by the position-accuracy evaluating unit 17, together with the positioning result, to the output unit 19. Alternatively, if the position-accuracy evaluating unit 17 evaluates the accuracy as being low (if a result indicating a level of accuracy higher than a predetermined level is not acquired), the position-accuracy evaluating unit 17 outputs information about a number of GPS satellites 20 to be selected to the satellite selecting unit 13, in order to perform positioning again by limiting the number of GPS satellites 20 of which positions are specified by the position calculating unit 15. The position-accuracy evaluating unit 17 may finish the positioning process when it evaluates the accuracy as being low.

The satellite-accuracy evaluating unit 18 is means for evaluating the accuracy GPS satellites 20 used to calculate the position of the receiver 10 by the position calculating unit 15 on the basis of the variation between the pseudo clock biases $\Delta r_n(T_p)$ of the GPS satellites 20 input from the position-accuracy evaluating unit 17. The accuracy of the GPS satellites 20 is equivalent to the ability of calculating pseudo-distances $pr_n$ having small error variation components $\epsilon'$ using signals from the GPS satellites 20 by the distance calculating unit 14.

The evaluation by the satellite-accuracy evaluating unit 18 is based on the fact that, when the error variation components $\epsilon'$ is small, the variation in the pseudo clock biases $\Delta r_n(T_p)$ between the GPS satellites 20 is small, and when the error variation components $\epsilon'$ is large, the variation is large. The position-accuracy evaluating unit 17 performs clustering of the GPS satellites 20 based on the pseudo clock biases $\Delta r_n(T_p)$. Through the clustering, GPS satellites having pseudo clock biases $\Delta r_n(T_p)$ that differ greatly from that of other GPS satellites can be extracted. For example, satellite-accuracy evaluating unit 18 evaluates the accuracy of the GPS satellites 20 extracted on the basis of the pseudo clock biases $\Delta r_n(T_p)$ as being low. A program for evaluating the accuracy of the GPS satellites 20 is stored in the satellite-accuracy evaluating unit 18 and is read out if necessary to perform evaluation.

Information about the evaluation of the accuracy of the GPS satellites 20 by the satellite-accuracy evaluating unit 18 is used appropriately at the receiver 10. For example, if the number of GPS satellites 20 that have been evaluated to have low accuracy is less than a predetermined number, the satellite-accuracy evaluating unit 18 outputs the positioning result (information about the position of the receiver 10 calculated by the position calculating unit 15) to the output unit 19. The satellite-accuracy evaluating unit 18 may output information about the evaluation on the GPS satellites 20, together with the positioning result, to the output unit 19. Alternatively, if the number of GPS satellites 20 that have been evaluated to have low accuracy is more than a predetermined number, the satellite-accuracy evaluating unit 18 outputs information about a number of GPS satellites 20 to be selected in order to perform positioning again by limiting the number of GPS satellites 20 of which positions are specified by the position calculating unit 15 to the satellite selecting unit 13. The satellite-accuracy evaluating unit 18 may finish the positioning process when the number of GPS satellites 20 that have been determined to have low accuracy is more than a predetermined number.

The output unit 19 is means for outputting information input from the position-accuracy evaluating unit 17 and the satellite-accuracy evaluating unit 18 as a screen display and/or sound. The output information includes, for example, information about the position of the receiver 10 calculated by the position calculating unit 15. The user of the receiver 10 can recognize the position of the receiver 10, i.e., the position of himself or herself, by referring to the output information.

Figure 13:
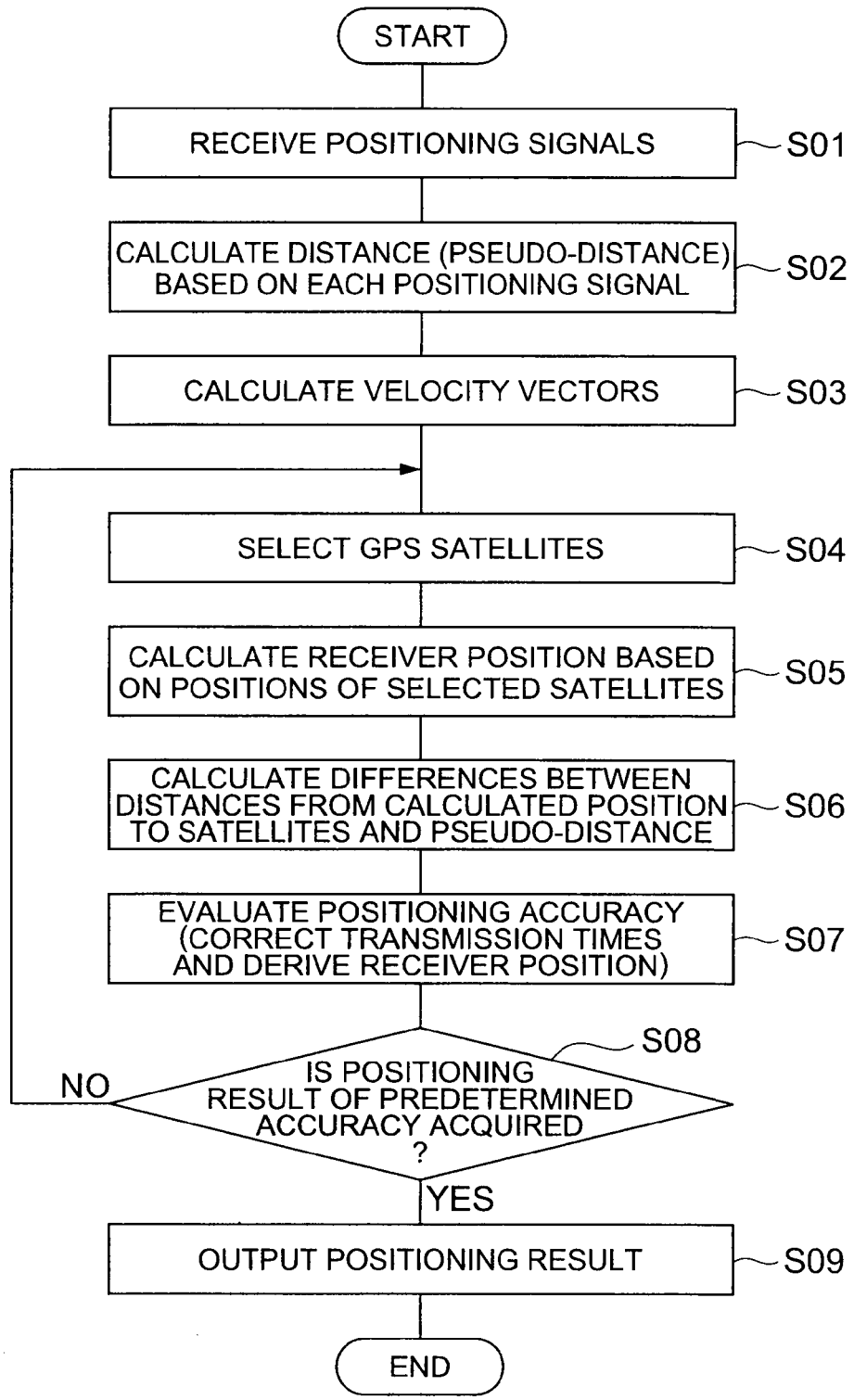
FIG. 13 is a flow chart illustrating a process (positioning method) carried out by the receiver shown in FIG. 1.

Next, a positioning method according to this embodiment will be described together with the process carried out by the receiver 10 shown in FIG. 1 with reference to FIG. 13. FIG. 13 is a flow chart illustrating the process carried out by the receiver 10.

The positioning process carried out by the receiver 10 started with, for example, the user input on a positioning request to the receiver 10 via the operating unit 104. Alternatively, the positioning process may start with another method such as another application program, which is run in the receiver 10, outputting a positioning request.

First, the signal receiving unit 11 receives positioning signals sent from the GPS satellites 20 (Step S01). The signal receiving unit 11 outputs the information contained in the received signals to the velocity-vector calculating unit 12 and the distance calculating unit 14.

Then, the distance calculating unit 14 calculates the distances (pseudo-distances) between the GPS satellites 20 and the receiver 10 on the basis of the information input from the signal receiving unit 11 (Step S02). The distance calculating unit 14 outputs information about the pseudo-distances to the position calculating unit 15 and the distance-difference calculating unit 16.

Then, the velocity-vector calculating unit 12 calculates the velocity vectors of the GPS satellites 20 on the basis of the information input from the signal receiving unit 11 (Step S03, velocity-vector calculating step). For example, the velocity-vector calculating unit 12 uses the above-described method to calculate velocity vectors in an ECEF coordinate system for each of the GPS satellites 20 and output the calculation results to the satellite selecting unit 13. The calculation of the velocity vectors by the velocity-vector calculating unit 12 and the calculation of the pseudo-distances by the distance calculating unit 14 may be carried out simultaneously.

Then, the satellite selecting unit 13 generates a combination of velocity vectors from a plurality of velocity vectors calculated and selects a combination of GPS satellites 20 from a plurality of GPS satellites, which are the senders of the signals received by the signal receiving unit 11, based on the generated combination of velocity vectors (Step S04, signal-source selecting step). The satellite selecting unit 13 outputs satellite selecting information about the selected GPS satellites 20 to the position calculating unit 15.

As described above, there are various methods of selecting the GPS satellites 20. The satellite selecting unit 13 may use any suitable method based on the content of the positioning request. For example, to determine whether or not all of the m number of GPS satellites 20 corresponding to an m number of input velocity vectors are to be selected, the satellite selecting unit 13 may use the above-described first or third method. To select an n number (where m>n) of GPS satellites 20 among the m number of GPS satellites 20 corresponding to the m number of input velocity vectors, the satellite selecting unit 13 may use the above-described second or fourth method.

Then, the position calculating unit 15 extracts the GPS satellites 20 of which the positions are to be determined from the GPS satellites 20 corresponding to the signals received by the signal receiving unit 11 on the basis of the input satellite selecting information. Then, the position calculating unit 15 calculates the position of the signal receiving unit 11 from information about the positions of the extracted GPS satellites 20 and information about the pseudo-distances input from the distance calculating unit 14 (Step S05, position calculating step). The position calculating unit 15 outputs information about the calculated position of the receiver 10 to the distance-difference calculating unit 16.

Then, the distance-difference calculating unit 16 calculates the pseudo clock biases $\Delta r_n$(TOW), which is the difference between the distances from the input position of the receiver 10 to the GPS satellites 20 and the pseudo-distances from the distance calculating unit 14, for every GPS satellite 20, which are input from the position calculating unit 15 (Step S06). The distance-difference calculating unit 16 outputs the calculated pseudo clock biases $\Delta r_n$(TOW) to the position-accuracy evaluating unit 17 and the satellite-accuracy evaluating unit 18.

Then, the position-accuracy evaluating unit 17 and the satellite-accuracy evaluating unit 18 evaluate the positioning accuracy (Step S07). In other words, the position-accuracy evaluating unit 17 evaluates the accuracy of the position of the receiver 10 calculated by the position calculating unit 15 on the basis of the variation in the pseudo clock biases $\Delta r_n$(TOW) between the GPS satellites 20.

At this time, the position-accuracy evaluating unit 17 sets the time when the variances $\sigma_{\Delta rn(TOW)}^2$ of the pseudo clock biases is the smallest value as a correct transmission time $T_p$ (transmission-time setting step). The position-accuracy evaluating unit 17 sets the positioning result at the transmission time $T_p$, which is set as the correct transmission time, as the final result (i.e., estimated position of the receiver 10) (estimated-position setting step).

The satellite-accuracy evaluating unit 18 evaluates the accuracy of the GPS satellites 20 used to calculate the position of the receiver 10 by the position calculating unit 15 on the basis of the variation in the pseudo clock biases $\Delta r_n(TOW)$ of the GPS satellites 20.

If the position-accuracy evaluating unit 17 and the satellite-accuracy evaluating unit 18 determine that a positioning result having a predetermined accuracy is acquired on the basis of the evaluation (YES in Step S08), the position-accuracy evaluating unit 17 outputs the positioning result (i.e., information about the position of the receiver 10 calculated by the position calculating unit 15) to the output unit 19, and the output unit 19 outputs the positioning result (Step S09). In this way, the user of the receiver 10 can acquire the positioning result.

Alternatively, if the position-accuracy evaluating unit 17 and the satellite-accuracy evaluating unit 18 determine that a positioning result having a predetermined accuracy has not been acquired (NO in Step S08), the position-accuracy evaluating unit 17 and the satellite-accuracy evaluating unit 18 determine to carry out positioning again and outputs information about a number of GPS satellites 20 to be selected to the satellite selecting unit 13. In this way, Steps S04 to S08 are repeated. For example, if the accuracy of the position of the receiver 10 calculated on the basis of six GPS satellites 20 does not achieve a predetermined level, the position-accuracy evaluating unit 17 and the satellite-accuracy evaluating unit 18 output information for reducing the six GPS satellites 20 to five GPS satellites 20 to the satellite selecting unit 13. In such a case, the satellite selecting unit 13 selects five GPS satellites 20 in such a manner as the second or fourth method described above.

However, such repeated processing is not mandatory, and positioning may be finished at a predetermined timing. For example, if the number of GPS satellites 20 of which positions are determined is less than or equal to a predetermined threshold value (for example, less than or equal to four), the position-accuracy evaluating unit 17 and the satellite-accuracy evaluating unit 18 may determine that positioning with a predetermined accuracy cannot be carried out even if a limited number of GPS satellites 20 is selected and may end the process. If the processes of Steps S04 to S08 are repeated, the satellite selecting unit 13 can change the method of selecting the GPS satellites 20, each time. For example, the satellite selecting unit 13 may use the above-described first method for the first process and then may use the above-described second method for the second process (i.e., repetition of the first process).

Figure 14:
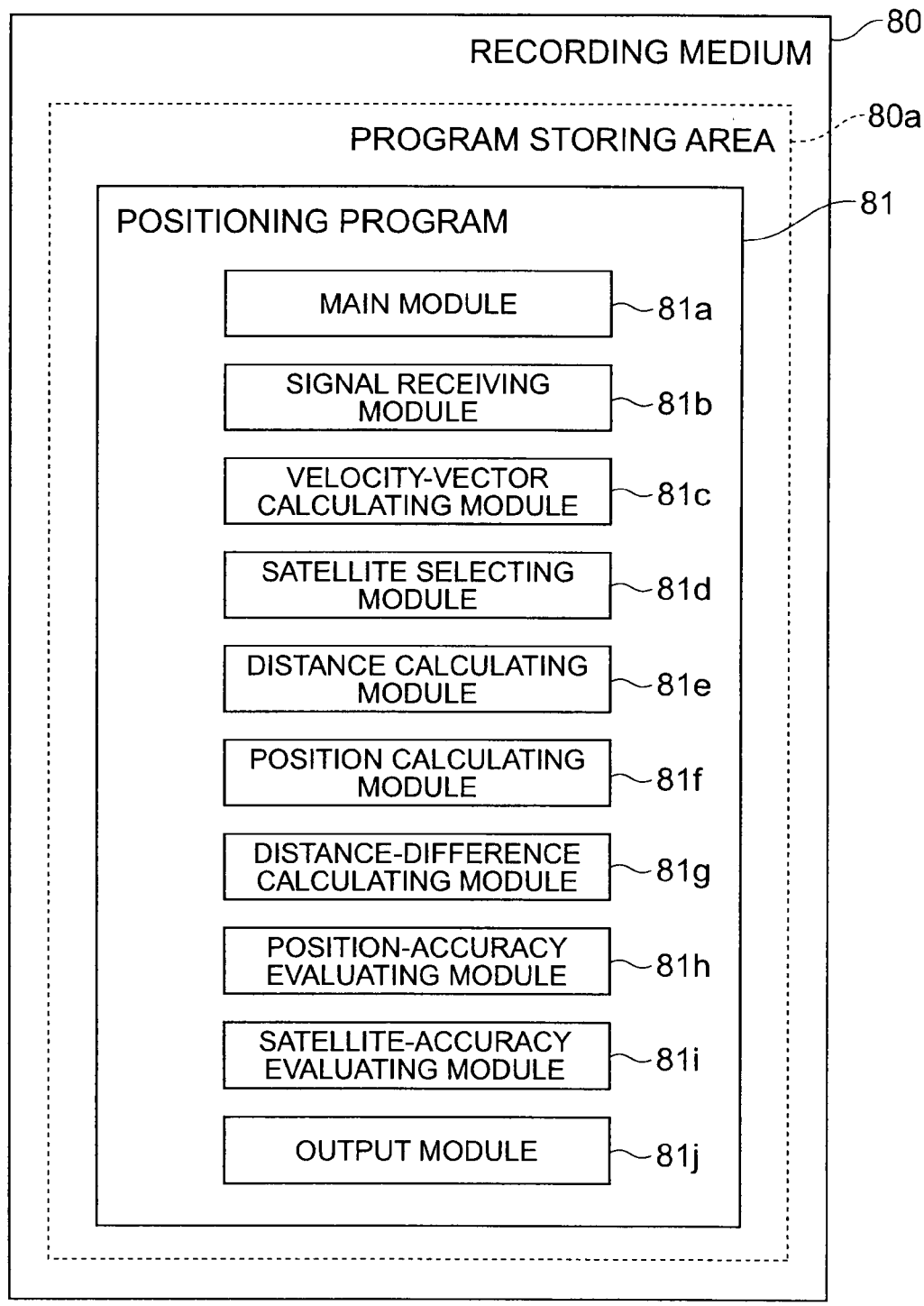
FIG. 14 illustrates a configuration of a positioning program according to an embodiment.

Next, a positioning program for allowing a computer to perform the above-described process of positioning the receiver 10 will be described. As shown in FIG. 14, a positioning program 81 is stored in a program-storing area 80*a* in a recording medium 80 included in a computer.

The positioning program 81 includes a main module 81*a* that controls the overall positioning process, a signal receiving module 81*b*, a velocity-vector calculating module 81*c*, a satellite selecting module 81*d*, a distance calculating module 81*e*, a position calculating module 81*f*, a distance-difference calculating module 81*g*, a position-accuracy evaluating module 81*h*, a satellite-accuracy evaluating module 81*i*, and an output module 81*j*. The signal receiving module 81*b*, the velocity-vector calculating module 81*c*, the satellite selecting module 81*d*, the distance calculating module 81*e*, the position calculating module 81*f*, the distance-difference calculating module 81*g*, the position-accuracy evaluating module 81*h*, the satellite-accuracy evaluating module 81*i*, and the output module 81*j* have the same functions as the signal receiving unit 11, the velocity-vector calculating unit 12, the satellite selecting unit 13, the distance calculating unit 14, the position calculating unit 15, the distance-difference calculating unit 16, the position-accuracy evaluating unit 17, the satellite-accuracy evaluating unit 18, and the output unit 19, respectively, in the receiver 10.

All or part of the positioning program 81 may be transmitted through a transmission medium, such as a communication line, and may be received by and recorded (installed) in other devices.

As described above, in the embodiments, a transmission time of signals from the GPS satellites 20 can be accurately estimated by selecting the GPS satellites 20 on the basis of a combination of velocity vectors, and setting one time selected from a plurality of times as the transmission time on the basis of signals from the selected GPS satellites 20. Moreover, the position of the receiver 10 can be accurately estimated by setting the position of the receiver 10 corresponding to the time set as transmission time, as the estimated position of the receiver 10.

In these embodiments, a plurality of GPS satellites 20 may be selected on the basis of a vector sum corresponding to a combination of velocity vectors. Since the vector sum can be easily calculated, the transmission time can be easily estimated by employing this method.

When the first method is employed, the estimation accuracy of the transmission time can be maintained at a certain level since the vector sum is evaluated using a threshold value. When the second method is employed, a combination of GPS satellites 20 that allows the transmission time to be estimated with the highest accuracy can be acquired since GPS satellites 20 that correspond to a combination having the minimum velocity sum are selected.

In this embodiment, a plurality of GPS satellites 20 can be selected on the basis of a value indicating the variation in velocity vectors included in a combination of velocity vectors. Using this value, the variation in the relative positions of the GPS satellites 20 can be accurately derived, and, as a result, the transmission time can be accurately estimated.

When the third method is employed, the estimation accuracy of the transmission time can be maintained at a certain level since the value indicating the variation in velocity vectors is evaluated using a threshold value. When the fourth method is employed, a combination of GPS satellites 20 that allows the transmission time to be estimated with the highest accuracy can be acquired since GPS satellites 20 that correspond to a combination having the maximum value indicating the variation in velocity vectors are selected.

The present invention has been described above through the embodiments. However, the present invention is not limited to these embodiments. Various modifications are can be made within the scope of the present invention.

In the above-described embodiments, the satellite selecting unit 13 selects GPS satellites 20 on the basis of velocity vectors. However, the method of selecting the GPS satellites 20 is not limited. For example, the satellite selecting unit 13 may employ both a known method and a method using velocity vectors to select the GPS satellites 20.

Examples of known methods include a method of evaluating the reception of the GPS satellite by a C/N ratio (signal-to-noise ratio) of a signal, a method of evaluating the variation in pseudo-distances on the basis of the root mean square (RMS) of the pseudo-distances, and a method of evaluating the geometric position of a GPS satellite using dilution of precision (DOP). Both the methods using the C/N ratio and the RMS evaluate each GPS satellite while the method using the DOP evaluates a combination of GPS satellites in such a manner similar to that according to the above-described embodiments.

For example, the satellite selecting unit 13 may first extract GPS satellites 20 of which the C/N ratio, RMS, and DOP are greater than predetermined threshold values and may select specific GPS satellites 20 from the extracted GPS satellites 20 using a method according to the above-described embodiments, i.e., a method based on velocity vectors.

In the above-described embodiments, the positioning accuracy is evaluated using pseudo clock biases. Alternatively, the positioning accuracy may be evaluated using another method, such as receiver autonomous integrity monitoring (RAIM). Details of RAIM is described in, for example, B W Parkinson, J J Spilker, "Global Positioning System: Theory and Applications Volume II—Chapter 5", American Institute of Aeronautics and Astronautics, Inc., pp. 143-164, 1996.

In the above-described embodiments, the GPS satellites 20 are used as signal transmitters. However, pseudo-satellites or base stations forming a mobile communication network may be used as signal transmitters.

In the above-described embodiments, the main component used for positioning is the receiver 10, which is also the subject of positioning. However, the main component used for positioning and the subject of positioning may be different. For example, the main component used for positioning may be a positioning server provided separately from the receiver 10. The positioning server, for example, is connected to the receiver 10 via the mobile communication network, receives information required for positioning from the receiver 10, and carries out positioning. The positioning server may receive information required for positioning from the receiver 10 and may carry out all of the calculations associated with positioning. Alternatively, the positioning server may receive information about the distances between the GPS satellites 20 and the receiver 10, which are calculated by the receiver 10, and may carry out calculations associated with positioning on the basis of the information about the distances. The positioning system described in claims may be applied for various devices, such as receivers and servers.

What is claimed is:

1. A positioning system estimating the position of a receiver, comprising:
   a velocity-vector calculating unit that calculates velocity vectors of a plurality of GPS (Global Positioning System) satellites on the basis of signals sent from the GPS satellites and received by the receiver, wherein the plurality of velocity vectors indicate a relative movement of the GPS satellites with respect to each other;
   a signal-transmitter selecting unit that generates a combination of velocity vectors from the velocity vectors calculated by the velocity-vector calculating unit and selects GPS satellites from the plurality of GPS satellites on the basis of the generated combination of velocity vectors;
   a position calculating unit that calculates positions of the receiver at a plurality of times, the times being signal transmission times, on the basis of signals transmitted from the GPS satellites selected by the signal-transmitter selecting unit and received by the receiver;
   a transmission-time setting unit that evaluates the accuracy of the positions of the receiver calculated by the position calculating unit and sets one time selected from the plurality of times corresponding to the plurality of positions as a transmission time; and
   an estimated-position setting unit that sets the position of the receiver corresponding to the transmission time set by the transmission-time setting unit as an estimated position of the receiver.

2. The positioning system according to claim 1, wherein the signal-transmitter selecting unit calculates a vector sum of the combination of velocity vectors and selects GPS satellites from the plurality of GPS satellites on the basis of the calculated vector sum.

3. The positioning system according to claim 2, wherein the signal-transmitter selecting unit generates a combination of velocity vectors calculated by the velocity-vector calculating unit and selects GPS satellites corresponding to the velocity vectors when the vector sum of the generated combination of the velocity vectors is less than or equal to a predetermined threshold value.

4. The positioning system according to claim 2, wherein the signal-transmitter selecting unit generates a plurality of combinations of velocity vectors each including a number of velocity vectors smaller than the number of velocity vectors calculated by the velocity-vector calculating unit, calculate vector sum of each of the generated combinations, and selects GPS satellites corresponding to the velocity vectors constituting the smallest vector sum among the calculated vector sums.

5. The positioning system according to claim 1, wherein the signal-transmitter selecting unit calculates a value indicating a variation in the velocity vectors of the combinations and select GPS satellites from the plurality of GPS satellites on the basis of the calculated value.

6. The positioning system according to claim 5, wherein the signal-transmitter selecting unit generates a combination of the velocity vectors calculated by the velocity-vector calculating unit and selects GPS satellites corresponding to the velocity vectors when the value indicating a variation in the velocity vectors of the generated combinations is equal to or more than a predetermined threshold value.

7. The positioning system according to claim 5, wherein the signal-transmitter selecting unit generates a plurality of combinations of velocity vectors each including a number of velocity vectors smaller than the number of velocity vectors calculated by the velocity-vector calculating unit, calculates values indicating variations in the velocity vectors of each of the generated combinations, and selects GPS satellites corresponding to the velocity vectors having the maximum value among the calculated values.

8. A positioning IC chip estimating the position of a receiver, comprising:
   a velocity-vector calculating unit that calculates velocity vectors of a plurality of GPS satellites on the basis of signals sent from the GPS satellites and received by the receiver, wherein the plurality of velocity vectors indicate a relative movement of the GPS satellites with respect to each other;
   a signal-transmitter selecting unit that generates a combination of velocity vectors from the velocity vectors calculated by the velocity-vector calculating unit and selects GPS satellites from the plurality of GPS satellites on the basis of the generated combination of velocity vectors;
   a position calculating unit that calculates positions of the receiver at a plurality of times, the times being signal transmission times, on the basis of signals transmitted from the GPS satellites selected by the signal-transmitter selecting unit and received by the receiver;

a transmission-time setting unit that evaluates the accuracy of the positions of the receiver calculated by the position calculating unit and sets one time selected from the plurality of times corresponding to the plurality of positions as a transmission time; and an estimated-position setting unit that sets the position of the receiver corresponding to the transmission time set by the transmission-time setting unit as an estimated position of the receiver.

9. A positioning method in which a positioning system estimates the position of a receiver, the positioning method comprising:

a velocity-vector calculating step in which the positioning system calculates velocity vectors of a plurality of GPS satellites on the basis of signals sent from the GPS satellites to the receiver, wherein the plurality of velocity vectors indicate a relative movement of the GPS satellites with respect to each other;

a signal-transmitter selecting step in which the positioning system generates a combination of velocity vectors from the velocity vectors calculated in the velocity-vector calculating step and selects GPS satellites from the plurality of GPS satellites on the basis of the selected combination of velocity vectors;

a position calculating step in which the positioning system calculates positions of the receiver at a plurality of times, the times being signal transmission times, on the basis of signals transmitted from the GPS satellites selected in the signal-transmitter selecting step and received by the receiver;

a transmission-time setting step in which the positioning system evaluates the accuracy of the positions of the receiver calculated in the position calculating step and sets one time selected from the plurality of times corresponding to the plurality of positions as a transmission time; and a estimated-position setting step in which the positioning system sets the position of the receiver corresponding to the transmission time set in the transmission-time setting step as an estimated position of the receiver.

10. A computer readable storage medium encoded with computer executable instructions, which when executed by a computer, cause the computer to perform a method of estimating a position of a receiver, comprising:

a velocity-vector calculating function of calculating velocity vectors of a plurality of GPS satellites on the basis of signals sent from the GPS satellites and received by the receiver, wherein the plurality of velocity vectors indicate a relative movement of the GPS satellites with respect to each other;

a signal-transmitter selecting function of generating a combination of velocity vectors from the velocity vectors calculated by the velocity-vector calculating function and of selecting GPS satellites from the plurality of GPS satellites on the basis of the generated combination of velocity vectors;

a position calculating function of calculating positions of the receiver at a plurality of times, the times being signal transmission times, on the basis of signals transmitted from the GPS satellites selected by the signal-transmitter selecting function and received by the receiver;

a transmission-time setting function of evaluating the accuracy of the positions of the receiver calculated by the position calculating function and of setting one time selected from the plurality of times corresponding to the plurality of positions as a transmission time; and a estimated-position setting function of setting the position of the receiver corresponding to the transmission time set by the transmission-time setting function as an estimated position of the receiver.

11. The positioning system according to claim 1, wherein the signal-transmitter selecting unit selects the GPS satellites from a plurality of different candidate groups of GPS satellites on the basis of one candidate group having a highest variation of velocity vectors amongst all the candidate groups.

* * * * *